(12) United States Patent
Tamura et al.

(10) Patent No.: US 8,916,304 B2
(45) Date of Patent: Dec. 23, 2014

(54) HYDROGEN GENERATOR AND FUEL CELL SYSTEM INCLUDING SAME

(75) Inventors: Yoshio Tamura, Hyogo (JP); Kiyoshi Taguchi, Osaka (JP); Yoshikazu Tanaka, Shiga (JP); Shigeki Yasuda, Osaka (JP)

(73) Assignee: Panasonic Corporation, Osaka (JP)

( * ) Notice: Subject to any disclaimer, the term of this patent is extended or adjusted under 35 U.S.C. 154(b) by 655 days.

(21) Appl. No.: 12/863,736

(22) PCT Filed: Nov. 20, 2009

(86) PCT No.: PCT/JP2009/006261
§ 371 (c)(1),
(2), (4) Date: Jul. 20, 2010

(87) PCT Pub. No.: WO2010/058592
PCT Pub. Date: May 27, 2010

(65) Prior Publication Data
US 2010/0285377 A1 Nov. 11, 2010

(30) Foreign Application Priority Data

Nov. 20, 2008 (JP) .................................. 2008-296969
Mar. 19, 2009 (JP) .................................. 2009-068841

(51) Int. Cl.
*H01M 8/06* (2006.01)
*G05B 1/00* (2006.01)
*G05D 23/00* (2006.01)
*C01B 3/38* (2006.01)

(52) U.S. Cl.
CPC ............. *H01M 8/0618* (2013.01); *C01B 3/384* (2013.01); *C01B 2203/0205* (2013.01); *C01B 2203/066* (2013.01); *C01B 2203/0811* (2013.01); *C01B 2203/0822* (2013.01); *C01B 2203/0827* (2013.01); *C01B 2203/0872* (2013.01); *C01B 2203/1609* (2013.01); *Y02E 60/50* (2013.01)
USPC ............................ 429/423; 422/105; 422/109

(58) Field of Classification Search
None
See application file for complete search history.

(56) References Cited

U.S. PATENT DOCUMENTS

| 4,741,978 | A | 5/1988 | Takabayashi |
| 7,052,790 | B2 * | 5/2006 | Nakamura et al. ............ 429/410 |

(Continued)

FOREIGN PATENT DOCUMENTS

| CN | 1409428 A | 4/2003 |
| JP | 02-132770 A | 5/1990 |

(Continued)

OTHER PUBLICATIONS

Extended European Search Report issued in European Patent Application No. 09827383.2 mailed Nov. 26, 2012.

(Continued)

*Primary Examiner* — Patrick Ryan
*Assistant Examiner* — Christopher Domone
(74) *Attorney, Agent, or Firm* — McDermott Will & Emery LLP

(57) ABSTRACT

A hydrogen generator includes: a reformer (102) configured to generate a hydrogen-containing gas by a reforming reaction using a raw material; a combustor (104) configured to heat the reformer; an air supplying device (106) configured to supply combustion air to the combustor; a first heat exchanger (108) configured to recover heat from a flue gas discharged from the combustor; a first heat medium passage (110) through which a first heat medium flows, the first heat medium receiving the heat recovered from the flue gas in the first heat exchanger; a first pump (112) configured to cause the first heat medium in the first heat medium passage to flow; a heat accumulator (140) configured to store the heat recovered by the first heat medium; and a controller (114) configured to cause the first pump to operate in a cooling step that is a step of cooling down at least the reformer by supplying the air from the air supplying device to the combustor in a state where the combustor is not carrying out combustion during a stop processing

16 Claims, 17 Drawing Sheets

(56) References Cited

U.S. PATENT DOCUMENTS

| | | |
|---|---|---|
| 7,687,035 B2 | 3/2010 | Terada et al. |
| 2002/0159928 A1 | 10/2002 | Naka et al. |
| 2003/0068540 A1 | 4/2003 | Ueda et al. |
| 2003/0162065 A1 | 8/2003 | Miyauchi et al. |
| 2004/0058230 A1* | 3/2004 | Hsu .................................. 429/62 |
| 2004/0131540 A1 | 7/2004 | Fujii et al. |
| 2004/0229097 A1 | 11/2004 | Hirakata et al. |
| 2005/0129997 A1* | 6/2005 | Maenishi et al. ............... 429/20 |
| 2005/0132649 A1 | 6/2005 | Tamura et al. |
| 2005/0175870 A1* | 8/2005 | Hagan et al. .................... 429/20 |
| 2005/0202294 A1 | 9/2005 | Gallagher et al. |
| 2005/0244765 A1 | 11/2005 | Okada et al. |
| 2006/0005557 A1 | 1/2006 | Takano et al. |
| 2006/0216562 A1* | 9/2006 | Edlund et al. .................... 429/26 |
| 2006/0246325 A1 | 11/2006 | Miyauchi et al. |
| 2007/0101647 A1 | 5/2007 | Miyauchi et al. |
| 2007/0148063 A1 | 6/2007 | Terada et al. |
| 2008/0026271 A1 | 1/2008 | Ueda et al. |
| 2008/0081231 A1 | 4/2008 | Kurita et al. |
| 2008/0160361 A1 | 7/2008 | Ohara et al. |
| 2008/0166284 A1* | 7/2008 | Son et al. ....................... 423/247 |
| 2009/0087701 A1 | 4/2009 | Kuwaba |
| 2009/0092883 A1 | 4/2009 | Ozeki et al. |
| 2009/0176138 A1 | 7/2009 | Miyauchi et al. |
| 2009/0181271 A1 | 7/2009 | Yasuda et al. |
| 2009/0317678 A1 | 12/2009 | Bono |
| 2010/0047636 A1 | 2/2010 | Tamura et al. |
| 2010/0062294 A1 | 3/2010 | Tamura |
| 2010/0092814 A1 | 4/2010 | Dutta et al. |
| 2010/0285377 A1 | 11/2010 | Tamura et al. |
| 2010/0291451 A1 | 11/2010 | Tamura et al. |
| 2011/0014528 A1 | 1/2011 | Kani et al. |
| 2011/0223099 A1 | 9/2011 | Nakamura et al. |

FOREIGN PATENT DOCUMENTS

| | | |
|---|---|---|
| JP | 2002-352839 A | 12/2002 |
| JP | 2002-367646 A | 12/2002 |
| JP | 2003-002605 A | 1/2003 |
| JP | 2004-006217 | 1/2004 |
| JP | 2004-247084 | 9/2004 |
| JP | 2004-296102 | 10/2004 |
| JP | 2004-307236 A | 11/2004 |
| JP | 2005-041709 | 2/2005 |
| JP | 2005-251603 A | 9/2005 |
| JP | 2005-259663 A | 9/2005 |
| JP | 2007-103035 A | 4/2007 |
| JP | 2007-132612 A | 5/2007 |
| JP | 2007-141787 A | 6/2007 |
| JP | 2007-169116 | 7/2007 |
| JP | 2007-175587 A | 7/2007 |
| JP | 2007-254251 | 10/2007 |
| JP | 2008-152999 A | 7/2008 |
| JP | 2008-266118 A | 11/2008 |
| JP | 2009-004346 | 1/2009 |
| JP | 2009-224115 A | 10/2009 |
| JP | 2012-256606 A | 12/2012 |
| WO | WO-2006/088077 A1 | 8/2006 |
| WO | 2007/145321 A1 | 12/2007 |
| WO | WO-2007/142278 A1 | 12/2007 |
| WO | WO-2008/035776 A1 | 3/2008 |
| WO | 2008/126686 A1 | 10/2008 |
| WO | 2010/058604 A1 | 5/2010 |

OTHER PUBLICATIONS

Chinese Office Action, and partial English translation thereof, issued in Chinese Patent Application No. 200980102593.X dated Jul. 30, 2012.

Chinese Office Action issued in corresponding Chinese Application No. 200980146102.1, dated Sep. 4, 2013, with English translation.

Japanese Office Action issued in Japanese Patent Application No. 2009-091105 mailed Jul. 16, 2013.

Japanese Office Action issued in Japanese Patent Application No. 2012-177075 mailed Dec. 17, 2013.

* cited by examiner

HYDROGEN GENERATOR AND FUEL CELL SYSTEM INCLUDING SAME

RELATED APPLICATIONS

This application is the U.S. National Phase under 35 U.S.C. §371 of International Application No. PCT/JP2009/006261, filed on Nov. 20, 2009, which in turn claims the benefit of Japanese Application No. 2008-296969, filed on Nov. 20, 2008, and Japanese Application No. 2009-068841, filed on Mar. 19, 2009, the disclosures of which Applications are incorporated by reference herein.

TECHNICAL FIELD

The present invention relates to a hydrogen generator and a fuel cell system including the same. More particularly, the present invention relates to a hydrogen generator configured to generate a hydrogen-containing gas from a hydrocarbon-based material and water by a steam-reforming reaction and a fuel cell system including the same.

BACKGROUND ART

In a fuel cell system capable of carrying out highly-efficient small-scale electric power generation, it is easy to construct a system for utilizing heat energy generated during electric power generation. Therefore, such fuel cell system has been developed as a distributed electric power generating system capable of realizing high energy use efficiency.

In the fuel cell system, when carrying out an electric power generating operation, a hydrogen-containing gas and an oxygen-containing gas are supplied to a fuel cell stack (hereinafter simply referred to as "fuel cell") provided as a main body of an electric power generating portion of the fuel cell system. Then, in the fuel cell, a predetermined electrochemical reaction proceeds by using hydrogen contained in the supplied hydrogen-containing gas and oxygen contained in the supplied oxygen-containing gas. By the progress of the predetermined electrochemical reaction, chemical energies of the hydrogen and the oxygen are directly converted into electric energy in the fuel cell. With this, the fuel cell system outputs electric power to a load.

Here, a means for supplying the hydrogen-containing gas necessary during the electric power generating operation of the fuel cell system is not usually built as an infrastructure. Therefore, a conventional fuel cell system is typically provided with a reformer configured to generate the hydrogen-containing gas necessary during the electric power generating operation. In the reformer, the hydrogen-containing gas is generated from the water and the raw material, such as a city gas, containing an organic compound by the progress of a steam-reforming reaction on a reforming catalyst. In this case, the reforming catalyst of the reformer is heated by a heater to a temperature appropriate for the progress of the steam-reforming reaction. Typically used as the heater is a combustion burner. The reforming catalyst of the reformer is heated by combusting a mixture gas of the city gas and air supplied by a combustion fan. Moreover, typically, a fuel off gas unconsumed in the fuel cell is combusted by the heater during the electric power generation or the like. Although the reformer is heated by the combusted gas, the combustion gas having been used for heating the reformer is still high in temperature. Therefore, in order to recover the heat of the combustion gas, the combustion gas is typically cooled down by the water using an exhaust gas heat exchanger. The water recovers the heat in the fuel cell system and is stored in a tank or the like as hot water of about 60 to 70° C. As above, a flue gas having recovered the heat is released through an exhaust port to outside atmosphere.

The reformer heated by the heater efficiently generates the hydrogen-containing gas from the water and the raw material, such as the city gas, by the reforming reaction. The fuel cell system generates the electric power by utilizing the hydrogen-containing gas generated by the reformer and, for example, the air as the oxygen-containing gas. Used as the water in the reforming reaction in the reformer is steam generated by a water evaporator provided in the hydrogen generator. In the case of especially reducing the energy loss and improving the efficiency of reforming, the water evaporator is typically included in the reformer.

The hydrogen-containing gas generated by the reformer contains carbon monoxide. Since the carbon monoxide poisons the catalyst contained in the fuel cell, the fuel cell cannot carry out electric power generation appropriately. In order to reduce a carbon monoxide concentration in the hydrogen-containing gas generated by the reformer, a shift converter for carrying out a shift reaction and a carbon monoxide remover for carrying out a selective oxidation reaction are typically provided. The reformer, the shift converter, and the carbon monoxide remover are collectively called a hydrogen generator.

Here, proposed is a fuel cell system in which since the hydrogen generator (reformer) is high in temperature when the fuel cell system stops operating, the combustion fan is activated after combustion stop of the combustion burner to supply cool air to the reformer, thereby cooling down the reformer (see PTL 1 for example).

CITATION LIST

Patent Literature

PTL 1: Japanese Laid-Open Patent Application Publication No. 2007-254251

SUMMARY OF INVENTION

Technical Problem

The following will explain a case where the hydrogen generator and the fuel cell system stop. PTL 1 describes that when the hydrogen generator and the fuel cell system stop, the high-temperature reformer is cooled down by the air supplied from the combustion fan. However, potential heat of the exhaust air having cooled down the reformer may cause heat deterioration of peripheral components (such as an O ring and a packing) of the exhaust gas heat exchanger. Moreover, since high-temperature air is released from the exhaust port that is a flue gas exit, a person may get burned if he or she is near the exhaust port while the reformer is being cooled down.

The present invention was made to solve the above problems, and an object of the present invention is to provide a hydrogen generator and a fuel cell system, each of which executes the cooling step while reducing a possibility that the heat deterioration of the exhaust gas heat exchanger may occur and a possibility that a person near the exhaust port may get burned.

Solution to Problem

To solve the above problems, a hydrogen generator of the present invention includes: a reformer configured to generate a hydrogen-containing gas by a reforming reaction using a raw material; a combustor configured to heat the reformer; an air supplying device configured to supply combustion air to the combustor; a first heat exchanger configured to recover heat from a flue gas discharged from the combustor; a first heat medium passage through which a first heat medium flows, the first heat medium receiving the heat recovered from the flue gas in the first heat exchanger; a first pump configured to cause the first heat medium in the first heat medium passage to flow; a heat accumulator configured to store the heat recovered by the heat medium; and a controller configured to cause the first pump to operate in a cooling step of cooling down at least the reformer by the air supplied from the air supplying device in a state where the combustor is not carrying out combustion when the hydrogen generator is not operating.

With this configuration, the possibility that the heat deterioration of the exhaust gas heat exchanger may occur and the possibility that the person near the exhaust port may get burned are reduced than before in the cooling step of the stop processing.

The hydrogen generator may further include a raw material supplying device configured to supply the raw material to the reformer, wherein: the raw material may be supplied from the raw material supplying device to the reformer when the hydrogen generator starts up, and the raw material having passed through the reformer may be combusted in the combustor to heat the reformer; and the controller may be configured to continue the cooling step until at least a temperature of the reformer becomes equal to or lower than a standby temperature.

In the hydrogen generator, the controller may be configured to stop the operation of the pump in accordance with the stop of the supply of the air from the air supplying device to the combustor.

Moreover, a fuel cell system of the present invention includes the above hydrogen generator and a fuel cell configured to generate electric power using the hydrogen-containing gas generated by the hydrogen generator.

With this configuration, the possibility that the heat deterioration of the exhaust gas heat exchanger may occur and the possibility that the person near the exhaust port may get burned are reduced than before in the cooling step of the stop processing.

In the above fuel cell system, a cathode purging operation of supplying the raw material to a cathode of the fuel cell and carrying out combustion in the combustor using a gas having passed through the cathode of the fuel cell may be carried out, and the cooling step may be a cooling step carried out after the cathode purging operation is terminated.

The above object, other objects, features and advantages of the present invention will be made clear by the following detailed explanation of preferred embodiments with reference to the attached drawings.

ADVANTAGEOUS EFFECTS OF INVENTION

Since the present invention has the above configuration, the possibility that the heat deterioration of the exhaust gas heat exchanger may occur and the possibility that the person near the exhaust port may get burned are reduced than before.

DESCRIPTION OF EMBODIMENTS

Hereinafter, preferred embodiments of the present invention will be explained in reference to the drawings.

Hereinafter, a hydrogen generator of the present invention and a fuel cell system including the hydrogen generator will be explained in reference to the drawings.

Figure 1:
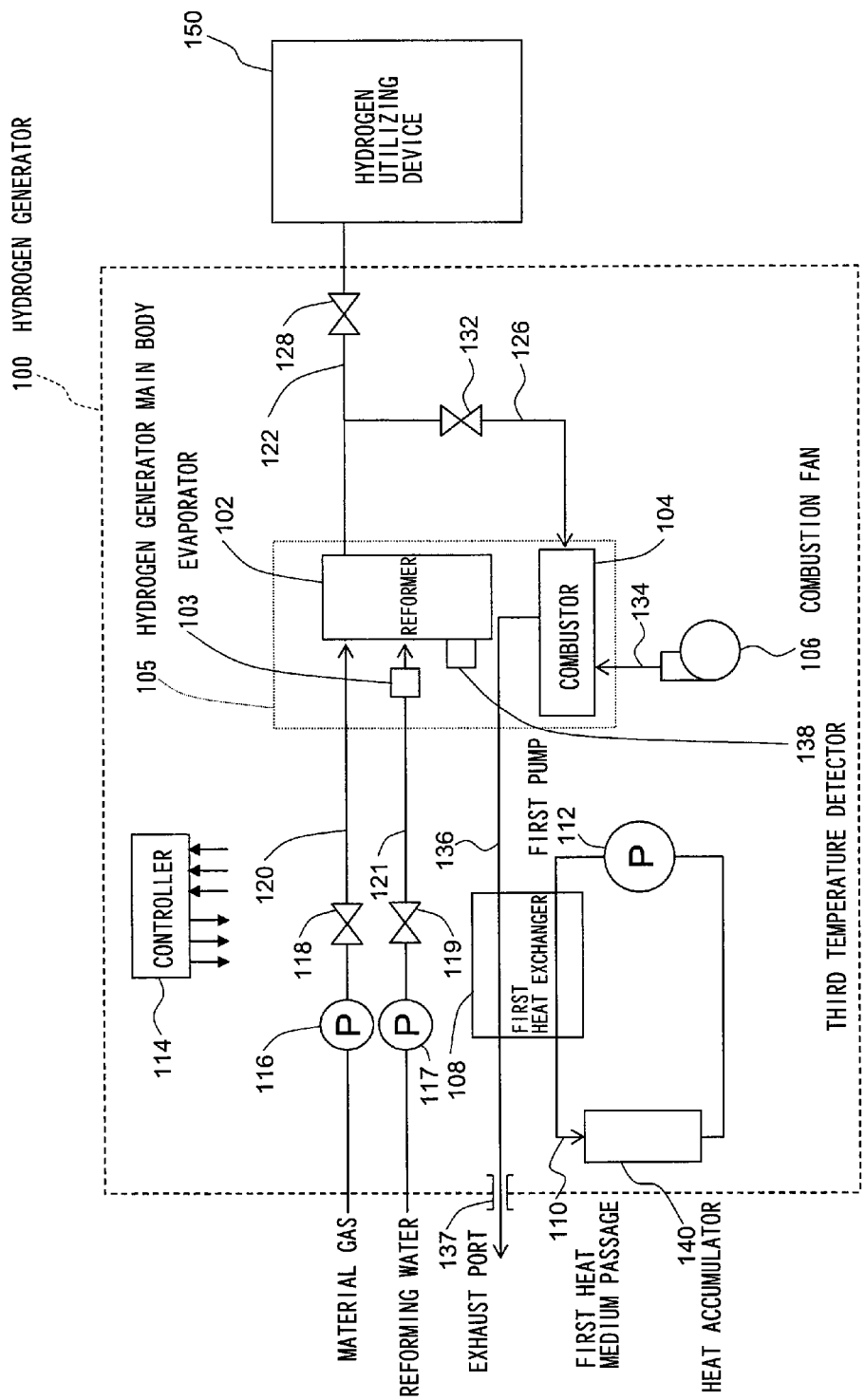
FIG. 1 is a block diagram showing one example of a schematic configuration of a hydrogen generator of Embodiment 1 of the present invention.
Figure 2:
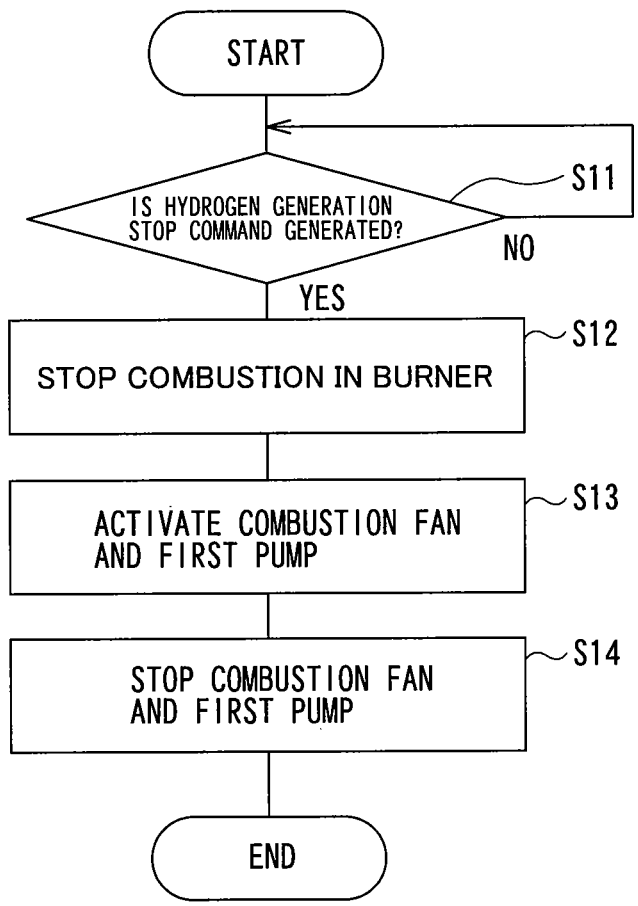
FIG. 2 is a flow chart showing one example of operations in a stop processing of the hydrogen generator of Embodiment 1 of the present invention.

A hydrogen generator (for example, a hydrogen generator 100 shown in FIG. 1 or a hydrogen generator 1002 shown in FIG. 5) according to the embodiment of a first invention of the present invention includes: a reformer (for example, a reformer 102) configured to generate a hydrogen-containing gas using a raw material by a reforming reaction; a combustor (for example, a combustor 104) configured to heat the reformer; an air supplying device (for example, a combustion fan 106) configured to supply combustion air to the combustor; a first heat exchanger (for example, a first heat exchanger 108) configured to recover heat from a flue gas discharged from the combustor; a first heat medium passage (for example, a first heat medium passage 110) through which a first heat medium flows, the first medium receiving the heat recovered from the flue gas in the heat exchanger; a first pump (for example, a first pump 112) configured to cause the first heat medium in the first heat medium passage to flow; a heat accumulator (for example, a heat accumulator 140 or a heat accumulator 141) configured to store the heat recovered by the first heat medium; and a controller (for example, a controller 114) configured to cause the first pump to operate in a cooling step (for example, Step S13 in FIG. 2; step of causing the air supplying device to operate without the execution of combustion in the combustor) that is a step of cooling down at least the reformer by the air supplied from the air supplying device in a state where the combustor is not executing the combustion when the hydrogen generator is not operating (for example, Step S12 and subsequent steps in FIG. 2; a state after the combustor has stopped the combustion).

With this, as compared to conventional hydrogen generators, the hydrogen generator of the present invention can reduce a possibility that the heat deterioration of the exhaust gas heat exchanger may occur and a possibility that a person near the exhaust port may get burned.

Here, the above-described "raw material" contains an organic compound having at least hydrogen and carbon as constituent elements. Specific examples are hydrocarbons, such as methane, propane gas, and city gas, and alcohols, such as methanol and ethanol.

Moreover, in the hydrogen generator of Embodiment 1, the air supplied by the air supplying device is used as combustion air when the combustor is carrying out the combustion and is used as cooling air when the combustor is not carrying out the combustion.

The "first heat exchanger" may be any device as long as the device can realize heat exchange between the flue gas and the first heat medium.

However, in light of the heat efficiency and the energy efficiency, it is desirable that the heat of the flue gas be recovered by the heat exchange to be utilized. The recovered heat may be utilized for hot water supply, floor heating, and the like. In this case, it is more preferable that the heat medium passage be connected to the heat accumulator (such as a hot water tank) or a passage of the floor heating.

The "first heat medium" is a liquid heat medium. Examples are liquid water and antifreezing fluids.

The "first pump" may be any device as long as the device drives the first heat medium such that the first heat medium flows in the first heat medium passage.

The "controller" may be constituted by one CPU (centralized control) or a plurality of CPUs (distributed control).

The "cooling step" is a step of cooling down at least the reformer by the air supplied from the air supplying device in a state where the combustor is not carrying out the combustion when the hydrogen generator is not operating. In the cooling step, the air supplying device may operate continuously or intermittently. In the cooling step, the air supplying device serves as a supplying device configured to supply a cooling medium (air) to cool down the reformer. In a state where the combustor is carrying out the combustion, the air supplying device serves as a supplying device configured to supply the combustion air.

The above-described "state where the combustor is not carrying out the combustion" is a state where, for example, flame is not generated in the combustor and combustion heat (reaction heat generated by a fuel oxidation reaction) is not generated.

A purpose of causing the first pump to operate in the cooling step is that by causing the heat medium to flow in the heat medium passage, the heat exchange (heat recovery from the exhaust air to the heat medium) in the heat exchanger is accelerated to cool down the exhaust air having recovered the heat from the reformer. In the cooling step, the first pump may operate continuously or intermittently.

A "raw material supplying device" may be any device as long as the device adjusts the flow rate of the raw material supplied to the reformer. Examples are a booster pump and a flow rate control valve.

Moreover, the hydrogen generator according to the embodiment of a second invention of the present invention is the same in configuration as the hydrogen generator according to the embodiment of the first invention of the present invention but further includes the raw material supplying device (for example, a booster pump 116) configured to supply the raw material to the reformer. In addition, the hydrogen generator according to the embodiment of the second invention of the present invention is configured such that: the raw material is supplied from the raw material supplying device to the reformer when the hydrogen generator starts up; the raw material having passed through the reformer is combusted in the combustor to heat the reformer; and the controller continues the cooling step until at least the temperature of the reformer becomes equal to or lower than a standby temperature.

With this, as compared to conventional hydrogen generators, the hydrogen generator of the present invention can quickly shift to a standby state for the next start-up while reducing the possibility that the heat deterioration of the exhaust gas heat exchanger may occur and the possibility that the person near the exhaust port may get burned.

Here, the "standby temperature" is defined as a temperature at which the hydrogen generator can terminate a stop processing and shift to the standby state for the next start-up. One example of the standby temperature is a temperature at which even if a start-up processing of the hydrogen generator is started and the material gas is supplied to the inside of the reformer, carbon does not deposit on the surface of a reforming catalyst of the reformer or on a passage located downstream of the reforming catalyst. Specifically, the standby temperature may be a predetermined temperature equal to or lower than 500° C. as an internal temperature of the reformer. Moreover, the temperature of the reformer may be detected by a temperature detector (for example, a third temperature detector 138) configured to directly detect the temperature of the reformer or by a detector (for example, a timing device configured to measure a time elapsed since the start of the stop processing) configured to indirectly detect the temperature of the reformer.

Moreover, the hydrogen generator according to the embodiment of a third invention of the present invention is the same in configuration as the hydrogen generator according to the embodiment of the first invention of the present invention but is configured such that the controller continues the cooling step until the temperature of the reformer becomes equal to or lower than a purge temperature.

With this, while reducing the possibility that the heat deterioration of the exhaust gas heat exchanger may occur and the possibility that the person near the exhaust port may get burned, the hydrogen generator of the present invention can more quickly reduce the temperature of the reformer to the purge temperature than a case where the cooling step is not carried out.

Here, the "purge temperature" is a temperature at which, for example, even if the raw material is caused to flow to purge the inside of the reformer, problems, such as the carbon deposition on the surfaces of the reforming catalyst and the like in the reformer, do not occur. The gas used for the purging is not limited to the raw material. For example, an inactive gas, such as nitrogen, may be used.

Moreover, the hydrogen generator according to the embodiment of a fourth invention of the present invention is the same in configuration as the hydrogen generator according to the embodiment of the third invention of the present invention but is configured such that the controller continues the cooling step at the time of abnormal stop of the hydrogen generator until the temperature of the reformer becomes equal to or lower than the purge temperature.

With this, at the time of the abnormal stop, the hydrogen generator of the present invention can more quickly reduce the temperature of the reformer to the purge temperature than a case where the cooling step is not carried out, while reducing the possibility that the heat deterioration of the exhaust gas heat exchanger may occur and the possibility that the person near the exhaust port may get burned. Moreover, since the temperature of the reformer is more quickly reduced to a temperature at which a maintenance man can work, the ease of maintenance improves.

Here, the "abnormal stop" denotes a case where the hydrogen generator stops operating due to an abnormality, such as a device failure (for example, a failure of the temperature detector, a failure of a CO sensor, or a failure of a combustion air supplying device), gas leakage abnormality (for example, combustible gas leakage abnormality), or a detected temperature abnormality of the temperature detector (for example, excessively increased or decreased reforming temperature). However, the abnormal stop is not limited to this.

Moreover, the hydrogen generator (for example, a hydrogen generator 1004 shown in FIG. 6) according to the embodiment of a fifth invention of the present invention is the same in configuration as the hydrogen generator according to the embodiment of the first invention of the present invention but is configured to include: the heat accumulator configured to store the first heat medium having passed through the first heat exchanger; a bypass passage (for example, a second bypass passage 127) which connects the first heat medium passage located upstream of the first heat exchanger and the first heat medium passage located downstream of the first heat exchanger and bypasses the heat accumulator; a first switching device (for example, a three-way valve 129) configured to switch a destination to which the first heat medium having passed through the first heat exchanger flows, between the heat accumulator and the bypass passage; and a first temperature detector (for example, a first temperature detector 123) configured to detect a temperature of the first heat medium having passed through the first heat exchanger. In addition, the controller maintains a state where the first switching device causes the first heat medium to flow in the bypass passage until the temperature detected by the first temperature detector becomes equal to or higher than a first threshold in the cooling step.

With this, the low-temperature first heat medium having recovered the exhaust heat from the exhaust air in the cooling step can be prevented from flowing into the heat accumulator. Thus, the temperature of the inside of the heat accumulator can be prevented from decreasing.

Here, the "first threshold" denotes a lower storage temperature limit (lower hot water temperature limit in a case where the heat accumulator is a hot water tank) set for, for example, preventing the temperature of the heat medium supplied to the heat accumulator from excessively decreasing.

Moreover, the hydrogen generator (for example, the hydrogen generator 1002 shown in FIG. 5) according to the embodiment of a sixth invention of the present invention is the same in configuration as the hydrogen generator according to the embodiment of the first invention of the present invention but further includes: a second heat exchanger (for example, a second heat exchanger 135) configured to recover the heat from the first heat medium in the first heat medium passage; a second heat medium passage (for example, a second heat medium passage 143) through which a second heat medium flows, the second heat medium receiving the heat recovered from the first heat medium in the second heat exchanger; a second pump (for example, a second pump 142) configured to cause the second heat medium in the second heat medium passage to flow; a bypass passage (for example, a third bypass passage 145) which connects the second heat medium passage located upstream of the second heat exchanger and the second heat medium passage located downstream of the second heat exchanger and bypasses the heat accumulator (for example, the heat accumulator 141); a second switching device (for example, a three-way valve 144) configured to switch a destination to which the second heat medium having passed through the second heat exchanger flows, between the heat accumulator and the bypass passage; and a second temperature detector (for example, a second temperature detector 148) configured to detect a temperature of the second heat medium having passed through the second heat exchanger. In addition, the heat accumulator is a heat accumulator configured to store the second heat medium having passed through the second heat exchanger, and the controller maintains a state where the second switching device causes the second heat medium to flow in the bypass passage until the temperature detected by the second temperature detector becomes equal to or higher than the first threshold in the cooling step.

With this, the low-temperature second heat medium having recovered the exhaust heat from the exhaust air in the cooling step can be prevented from flowing into the heat accumulator. Thus, the temperature of the inside of the heat accumulator can be prevented from decreasing.

Here, the "second heat exchanger" may be any device as long as the device can realize the heat exchange between the first heat medium and the second heat medium. However, in light of the heat efficiency and the energy efficiency, it is desirable that the heat of the first heat medium be recovered by the heat exchange to be utilized. The recovered heat may be utilized for hot water supply, floor heating, and the like. In this case, it is more preferable that the second heat medium passage be connected to the heat accumulator (such as the hot water tank) or the passage of the floor heating.

The "second heat medium" is a liquid heat medium. Examples are liquid water and antifreezing fluids.

The "second pump" may be any device as long as the device drives the second heat medium such that the second heat medium flows in the second heat medium passage.

Moreover, the hydrogen generator (for example, the hydrogen generator 1004 shown in FIG. 6) according to the embodiment of a seventh invention of the present invention is the same in configuration as the hydrogen generator according to the embodiment of the first invention of the present invention but further includes a first temperature detector (for example, the first temperature detector 123) configured to detect the temperature of the first heat medium having passed through the first heat exchanger. In addition, the controller executes a first heat recovery operation and a second heat recovery operation in this order. In the first heat recovery operation, a manipulated variable of the first pump is controlled based on the temperature detected by the first temperature detector. In the second heat recovery operation, the manipulated variable of the first pump is forcibly controlled to be equal to or larger than a predetermined value regardless of the temperature detected by the first temperature detector.

With this, in a case where the exhaust air having recovered the heat from the reformer is high in temperature, the temperature of the first heat medium is controlled to become a temperature appropriate for storage in the heat accumulator. Then, in a case where the exhaust air having recovered the heat from the reformer decreases in temperature, the heat recovery operation is executed regardless of the temperature of the first heat medium. To be specific, as compared to conventional hydrogen generators, the possibility that the person near the exhaust port may get burned can be reduced while considering the utilization of the stored heat recovered by the first heat medium.

Moreover, the hydrogen generator (for example, the hydrogen generator 1004 shown in FIG. 6) according to the embodiment of an eighth invention of the present invention is the same in configuration as the hydrogen generator according to the embodiment of the seventh invention of the present invention. In this hydrogen generator, the heat accumulator is a heat accumulator configured to store the first heat medium having passed through the first heat exchanger, and the hydrogen generator further includes: a bypass passage which connects the first heat medium passage located upstream of the first heat exchanger and the first heat medium passage located downstream of the first heat exchanger and bypasses the heat accumulator; and a first switching device configured to switch a destination to which the first heat medium having passed through the first heat exchanger flows, between the heat accumulator and the bypass passage. In addition, the controller switches the first switching device such that the first switching device causes the first heat medium to flow in the heat accumulator in a case where the temperature detected by the first temperature detector is equal to or higher than the first threshold in the second heat recovery operation. Moreover, the controller switches the first switching device such that the first switching device causes the first heat medium to flow in the bypass passage in a case where the temperature detected by the first temperature detector is equal to or lower than a second threshold that is smaller than the first threshold in the second heat recovery operation.

With this, in the second heat recovery operation, the temperature of the first heat medium supplied to the heat accumulator is controlled to become an appropriate temperature. Thus, the low-temperature first heat medium is prevented from flowing into the heat accumulator.

Moreover, the hydrogen generator (for example, a hydrogen generator 1006 shown in FIG. 7) according to the embodiment of a ninth invention of the present invention is the same in configuration as the hydrogen generator according to the embodiment of the first invention of the present invention but further includes: a second heat exchanger configured to recover the heat from the first heat medium in the first heat medium passage; a second heat medium passage through which a second heat medium flows, the second heat medium receiving the heat recovered from the first heat medium in the second heat exchanger; a second pump configured to cause the second heat medium in the second heat medium passage to flow; and a second temperature detector configured to detect a temperature of the second heat medium having passed through the second heat exchanger. In addition, the heat accumulator is a heat accumulator configured to store the second heat medium having passed through the second heat exchanger, and the controller executes a first heat recovery operation and a second heat recovery operation in this order. In the first heat recovery operation, a manipulated variable of the second pump is controlled based on the temperature detected by the second temperature detector. In the second heat recovery operation, the manipulated variable of the second pump is forcibly controlled to be equal to or larger than a predetermined value regardless of the temperature detected by the second temperature detector.

With this, in a case where the exhaust air having recovered the heat from the reformer is high in temperature, the temperature of the second heat medium is controlled to become a temperature appropriate for storage in the heat accumulator. Then, in a case where the exhaust air having recovered the heat from the reformer decreases in temperature, the heat recovery operation is executed regardless of the temperature of the second heat medium. To be specific, the cooling of the reformer is accelerated while considering the utilization of the stored heat recovered by the second heat medium.

Moreover, the hydrogen generator (for example, a hydrogen generator 1006 shown in FIG. 7) according to the embodiment of a tenth invention of the present invention is the same in configuration as the hydrogen generator according to the embodiment of the ninth invention of the present invention but further includes: a bypass passage which connects the second heat medium passage located upstream of the second heat exchanger and the second heat medium passage located downstream of the second heat exchanger and bypasses the heat accumulator; and a second switching device configured to switch a destination to which the second heat medium having passed through the second heat exchanger flows, between the heat accumulator and the bypass passage. In addition, the controller switches the switching device such that the switching device causes the second heat medium to flow in the heat accumulator in a case where the temperature detected by the second temperature detector is equal to or higher than the first threshold in the second heat recovery operation. Moreover, the controller switches the switching device such that the switching device causes the second heat medium to flow in the bypass passage in a case where the temperature detected by the second temperature detector is equal to or lower than a second threshold that is smaller than the first threshold in the second heat recovery operation.

With this, in the second heat recovery operation, the temperature of the second heat medium supplied to the heat accumulator is controlled to become an appropriate temperature. Thus, the low-temperature second heat medium is prevented from flowing into the heat accumulator.

Moreover, the hydrogen generator (for example, the hydrogen generator 100 shown in FIG. 1) according to the embodiment of an eleventh invention of the present invention is the same in configuration as the hydrogen generator of Embodiment 1 of the present invention but is configured such that: in a raw material purging operation of purging an inside of the reformer by the raw material after the cooling step, the gas discharged from the reformer is combusted in the combustor, and the first pump is activated; and the controller increases a manipulated variable of the first pump in the raw material purging operation as compared to in the cooling step.

In the raw material purging operation, since the gas discharged from the reformer is combusted in the combustor, the potential heat of the gas flowing through the flue gas passage becomes larger in amount than that in the cooling step of the reformer. However, in the hydrogen generator of the present embodiment, the first pump is controlled such that the amount of heat recovery becomes larger in the raw material purging operation than in the cooling step. Therefore, the possibility that the heat deterioration of the exhaust gas heat exchanger may occur and the possibility that the person near the exhaust port may get burned can be reduced in the raw material purging operation.

Moreover, the hydrogen generator (for example, the hydrogen generator 1002 shown in FIG. 5) according to the embodiment of a twelfth invention of the present invention is the same in configuration as the hydrogen generator according to the embodiment of the first invention of the present invention but further includes: a second heat exchanger configured to recover the heat from the first heat medium in the first heat medium passage; a second heat medium passage through which a second heat medium flows, the second heat medium receiving the heat recovered from the first heat medium in the second heat exchanger; and a second pump configured to cause the second heat medium in the second heat medium passage to flow. In addition, in a raw material purging operation of purging an inside of the reformer by the raw material after the cooling step, the gas discharged from the reformer is combusted in the combustor, and the second pump is activated. Moreover, the controller increases a manipulated variable of the second pump in the raw material purging operation as compared to in the cooling step.

In the raw material purging operation, since the gas discharged from the reformer is combusted in the combustor, the potential heat of the gas flowing through the flue gas passage becomes larger in amount than that in the cooling step of the reformer. In the hydrogen generator of the present embodiment, the second pump is controlled such that the amount of heat recovery becomes larger in the raw material purging operation than in the cooling step. Therefore, the possibility that the heat deterioration of the exhaust gas heat exchanger may occur and the possibility that the person near the exhaust port may get burned can be reduced in the raw material purging operation.

Moreover, the fuel cell system (for example, a fuel cell system 200 shown in FIG. 13) according to the embodiment of a thirteenth invention of the present invention includes: the hydrogen generator according to the embodiment of any one of the first to twelfth inventions of the present invention; and a fuel cell (for example, a fuel cell 250) configured to generate the electric power using the hydrogen-containing gas generated by the hydrogen generator.

With this, as compared to conventional fuel cell systems, the possibility that the heat deterioration of the exhaust gas heat exchanger may occur and the possibility that the person near the exhaust port may get burned can be reduced.

Here, used as the "fuel cell" is a polymer electrolyte fuel cell (PEFC), a solid oxide fuel cell (SOFC), or the like. Normally, the solid oxide fuel cell may be an indirect internal reforming type individually including a reformer portion configured to execute the reforming reaction and a fuel cell portion or an internal reforming type configured to carry out the reforming reaction in a fuel cell main body. To be specific, the fuel cell system in which the reformer is incorporated in the fuel cell may be adopted. The fuel cell system of the present invention includes such system.

Moreover, the fuel cell system (for example, the fuel cell system 200 shown in FIG. 13) according to the embodiment of a fourteenth invention of the present invention is the same in configuration as the fuel cell system according to the embodiment of the thirteenth invention of the present invention but is configured such that: a cathode purging operation of supplying the raw material to a cathode of the fuel cell and carrying out combustion in the combustor using a gas having passed through the cathode of the fuel cell is carried out; and the cooling step is a cooling step carried out after the cathode purging operation is terminated.

With this, since the combustion is carried out in the combustor using the gas having passed through the cathode in the cathode purging operation, the heat including the heat applied in cathode purging can be more quickly recovered from the reformer. Thus, the reformer can be cooled down.

Embodiment 1

Hereinafter, the hydrogen generator of Embodiment 1 of the present invention will be explained in reference to the drawings.

Details of Device Configuration

Hereinafter, details of a device configuration of the hydrogen generator 100 will be explained in reference to FIG. 1.

An upstream portion of the booster pump 116 is connected to a material gas supply source (for example, a city gas infrastructure). A downstream portion of the booster pump 116 is connected to the reformer 102 through a material gas supplying passage 120. A first on-off valve 118 is disposed on the material gas supplying passage 120.

An entrance of a reforming water pump 117 is connected to a water supply source (for example, a water tank storing condensed water in the flue gas generated by the first heat exchanger 108, or water infrastructure). An exit of the reforming water pump 117 is connected to an evaporator 103, and the evaporator 103 is connected to the reformer 102. A second on-off valve 119 is disposed on a reforming water supplying passage 121 extending between the reforming water pump 117 and the evaporator 103.

In FIG. 1, the gas discharged from the reformer 102 is directly discharged from a hydrogen generator main body 105. However, in order to reduce the carbon monoxide contained in the hydrogen-containing gas generated by the reformer 102, a shift converter including a shift catalyst (for example, a Cu—Zn-based catalyst) and a CO remover including an oxidation catalyst (for example, a Pt-based catalyst) may be provided downstream of the reformer 102. A hydrogen-containing gas exit of the hydrogen generator main body 105 is connected to a hydrogen utilizing device 150 through a fuel gas supplying passage 122. A third on-off valve 128 is disposed on the fuel gas supplying passage 122.

A first bypass passage 126 is formed, which branches from a portion of the fuel gas supplying passage 122 and bypasses the hydrogen utilizing device 150 to be connected to a combustor 104. A fifth on-off valve 132 is disposed on the first bypass passage 126.

The combustion fan 106 is connected to the combustor 104 via a combustion air supplying passage 134. A flue gas passage 136 is formed, through which the flue gas discharged from the combustor 104 flows. The flue gas passage 136 is configured to be able to exchange heat with at least the reformer 102. The reformer 102 is heated by the flue gas in the flue gas. In a case where the shift converter and the CO remover are further provided in the hydrogen generator main body 105, these reactors may be heated by the flue gas. The flue gas passage 136 may be configured to be able to exchange heat with the evaporator 103.

Moreover, the flue gas passage 136 extends through the inside of the first heat exchanger 108. The first heat medium passage 110 through which the first heat medium recovering the heat from the flue gas in the heat exchanger 110 flows also extends through the inside of the first heat exchanger 108. The first pump 112 is disposed on the first heat medium passage 110. The flue gas in the flue gas passage 136 and the heat medium in the first heat medium passage 110 are configured to be able to exchange heat with each other in the first heat exchanger 108.

The first heat medium having passed through the first heat exchanger 108 is stored in the heat accumulator 140. The first pump 112 supplies the first heat medium from the heat accumulator 140 to the first heat exchanger 108.

The third temperature detector 138 is attached to the reformer 102. The third temperature detector 138 detects the temperature of the reformer 102 and transmits the detected temperature to the controller 114.

The controller 114 includes a CPU, a memory, and the like. The controller 114 is electrically connected to the on-off valves 118, 119, 128, and 132, the combustion fan 106, the first pump 112, the booster pump 116, and the like and controls these.

The hydrogen utilizing device 150 of the present embodiment may be, for example, a hydrogen storing tank. However, the present embodiment is not limited to this, and any device, such as a fuel cell, may be used as long as the device utilizes hydrogen. Each of the on-off valves may be, for example, a solenoid valve. The third temperature detector 138 may be a temperature sensor, such as a thermistor.

Operation: Hydrogen Generating Operation

Hereinafter, a hydrogen generating operation of the hydrogen generator 100 will be schematically explained. The following operations are executed such that the controller 114 controls respective devices of the hydrogen generator 100.

The first on-off valve 118 and the second on-off valve 119 are open. The material gas is supplied by the booster pump 116 to the reformer 102 through the material gas supplying passage 120. Reforming water is supplied to the evaporator 103 through the reforming water supplying passage 121.

The reformer 102 is heated by the flue gas discharged from the combustor 104. In the evaporator 103, the reforming water becomes steam. In the reformer 102, the hydrogen-containing gas (fuel gas) is generated from the steam and the material gas by the steam-reforming reaction. The controller 114 closes the third on-off valve 128 and opens the fifth on-off valve 132 such that the generated hydrogen-containing gas is supplied as a combustion gas to the combustor 104 through the first bypass passage 126 in the start-up processing.

After the start-up processing is terminated, the controller 114 opens the third on-off valve 128 while maintaining the open state of the fifth on-off valve 132. Thus, the supply of the hydrogen-containing gas to the hydrogen utilizing device 150 starts, and the hydrogen generating operation starts. Even during the hydrogen generating operation, a part of the hydrogen-containing gas discharged from the hydrogen generator main body 105 is supplied to the combustor 104 through the first bypass passage 126 and is combusted in the combustor 104. Thus, the reformer 102 is maintained at a temperature appropriate for the reforming reaction.

The flue gas generated in the combustor 104 flows through the flue gas passage 136 and is cooled down in the first heat exchanger 108. After the moisture in the flue gas is condensed, the flue gas is discharged through an exhaust port 137 to outside of a casing of the hydrogen generator 100.

Operation: Start-up Processing

Hereinafter, operations carried out when the hydrogen generator 100 of the present embodiment starts up will be schematically explained. The following operations are executed such that the controller 114 controls respective portions of the hydrogen generator 100.

In a case where the start-up is requested in the standby state for the start-up, the controller 114 outputs a start-up command and starts the start-up processing including an operation of increasing the temperature of the hydrogen generator main body 105 of the hydrogen generator 100.

Here, the start-up processing includes an operation of increasing the temperature of the hydrogen generator until the temperature of the hydrogen generator reaches a temperature appropriate for the hydrogen generator to stably generate the hydrogen-containing gas containing high-concentration hydrogen ($H_2$ gas).

In the start-up processing, the operation of increasing the temperature of the hydrogen generator main body 105 including the reformer 102 is executed such that: the raw material supplying device (the booster pump 116) is activated to supply the raw material to the reformer 102; the third on-off valve 128 is closed and the fifth on-off valve 132 opens; and a combustible gas supplied to the combustor 104 through the first bypass passage 126 is combusted.

The reformer 102 and the evaporator 103 are heated by the above temperature increasing operation. When the temperature of the evaporator 103 reaches a temperature (evaporating temperature) at which the evaporator 103 can generate the steam, the second on-off valve 119 opens, and the reforming water supplying device (reforming water pump 117) is activated to start supplying the reforming water to the evaporator 103. The evaporating temperature is set as a temperature not lower than 100° C. Whether or not the temperature of the evaporator 103 has reached the evaporating temperature or higher is determined based on the temperature detected by the third temperature detector 138. In this case, a temperature threshold for determining whether or not the temperature of the evaporator 103 has reached the evaporating temperature or higher is set for the temperature detected by the third temperature detector 138.

By starting supplying the reforming water to the evaporator 103 as above, the hydrogen-containing gas is generated by the steam-reforming reaction from the steam generated by the evaporator and the material gas supplied through the material gas supplying passage 120.

Further, the temperature increasing operation continues until the temperature of the reformer 102 reaches a stable temperature appropriate for the reforming reaction capable of generating the hydrogen-containing gas containing hydrogen at high concentration. In a case where the temperature detected by the third temperature detector 138 becomes equal to or higher than the stable temperature by the temperature increasing operation, the start-up processing of the hydrogen generator 100 is terminated, and the controller 114 opens the third on-off valve 128 while maintaining the open state of the fifth on-off valve 132. Thus, the supply of the hydrogen-containing gas to the hydrogen utilizing device 150 starts. In a case where the hydrogen generator main body 105 includes the shift converter configured to reduce the carbon monoxide by the shift reaction and the CO remover configured to reduce the carbon monoxide by the oxidation reaction as the reactors configured to reduce the carbon monoxide in the hydrogen-containing gas generated by the reformer 102, the start-up processing is terminated after it is confirmed that the temperature of each of the shift converter and the CO remover has become equal to or higher than a stable temperature appropriate for each of the shift converter and the CO remover. Here, the temperature of each of the shift converter and the CO remover is detected by a temperature detector provided for each reactor.

Operation: Stop Processing

Figure 3:
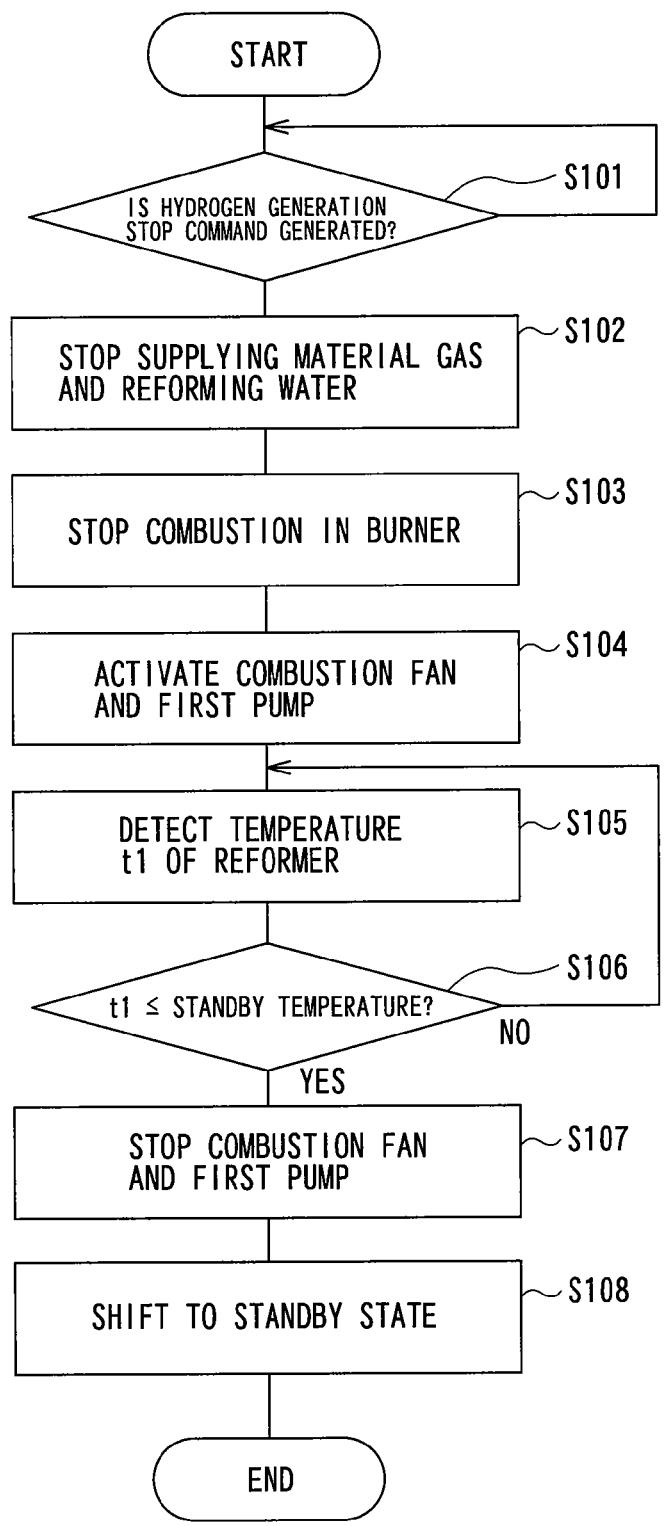
FIG. 3 is a flow chart schematically showing operations carried out when the hydrogen generator of Embodiment 1 of the present invention stops operating.

FIG. 3 is a flow chart schematically showing operations carried out when the hydrogen generator of Embodiment 1 of the present invention stops operating. Hereinafter, the operations of the stop processing of the hydrogen generator 100 of the present embodiment will be schematically explained in reference to FIG. 3.

Whether or not a hydrogen generation stop command is generated is determined in the hydrogen generating operation of the hydrogen generator 100 (Step S101). In a case where the hydrogen generation stop command is generated, the operation of each of the booster pump 116 and the reforming water pump 117 stops, and the first on-off valve 118 and the second on-off valve 119 are closed. Thus, the supply of each of the material gas and the reforming water stops (Step S102).

Next, the fifth on-off valve 132 is closed. Thus, the combustion in the combustor 104 (burner) stops (Step S103). In the combustion stop of the combustor in Step S103, an operation of discharging the combustible gas remaining in the combustor 104 to outside the casing by supplying the air from the combustion fan 106 is normally executed after the flame is extinguished in the combustor. Thus, a combustion stop processing of the combustor 104 is terminated. Next, in a state where the combustion in the combustor 104 does not occur, the combustion fan 106 and the first pump 112 are activated. Thus, the reformer 102 is cooled down by the air supplied from the combustion fan 106, and the potential heat of the exhaust air having cooled down the reformer 102 is recovered by the first heat medium (Step S104: cooling step). In this cooling step, the operation of each of the combustion fan 106 and the first pump 112 may be carried out continuously or intermittently.

Next, a temperature t1 of the reformer 102 is detected by the third temperature detector 138 (Step S105), and whether or not the temperature t1 is equal to or lower than the standby temperature (for example, 500° C. or lower) is determined (Step S106).

In a case where the result of the determination in Step S106 is YES, the operation of the combustion fan 106 stops, and the operation of the first pump 112 stops (Step S107). Thus, the stop processing is terminated, and the hydrogen generator 100 shifts to the standby state (Step S108).

In a case where the result of the determination in Step S106 is NO, the process returns to Step S105.

The "standby temperature" is defined as a temperature at which the hydrogen generator can terminate the stop processing and shift to the standby state (standby state where the start-up processing is started immediately if the start-up request is generated) for the next start-up. One example of the standby temperature is a temperature at which even if the start-up processing starts, and the material gas is supplied to the inside of the reformer 102, carbon does not deposit on the surface of the reforming catalyst of the reformer or on the passage located downstream of the reforming catalyst. Specifically, the standby temperature may be a predetermined temperature equal to or lower than 500° C. as an internal temperature of the reformer 102.

Moreover, in the foregoing, the cooling step and the heat recovery operation are continued until the temperature detected by the third temperature detector 138 reaches the standby temperature. However, the present embodiment is not limited to this. For example, in the case of carrying out, as the stop processing of the hydrogen generator 100, a purging operation of purging at least the inside of the reformer 102 by a replacement gas, the cooling step may be continued until the temperature reaches a temperature (purge temperature) at which the purging operation can be carried out. Here, the "purge temperature" is set as, for example, a temperature at which in a case where the replacement gas is the raw material and is discharged from the hydrogen generator 105 in the purging operation and combusted in the combustor 104, the temperature of the reformer 102 does not exceed an upper temperature limit at which carbon of the material gas does not deposit. Specifically, the purge temperature is set as a temperature (for example, 300° C.) that is equal to or lower than a value obtained by subtracting the increased temperature of the reformer 102 in the purging operation from the upper temperature limit of the reformer 102, the upper temperature limit being set such that carbon does not deposit from the material gas.

In the hydrogen generator 100 of the present embodiment configured as above, the pump configured to cause the first heat medium to flow is activated in the cooling step of the reformer by the combustion air. Therefore, the exhaust air which is increased in temperature by cooling down the reformer 102 and the like and flows through the flue gas passage 136 is not directly discharged to outside of the casing of the hydrogen generator 100 but is cooled down in the first heat exchanger 108 and then discharged through the exhaust port 137 of the flue gas to outside of the casing of the hydrogen generator 100. Therefore, even if a person is near the exhaust port of the flue gas, the possibility that the person may get burned by the gas discharged from the exhaust port in the cooling step can be reduced as compared to the conventional hydrogen generators. In addition, since the exhaust air is cooled down by the heat medium in the first heat exchanger 108 in the cooling step, the heat deterioration of peripheral components (such as the O ring and the packing) of the first heat exchanger 108 is unlikely to occur.

MODIFICATION EXAMPLE 1

The hydrogen generator of Modification Example 1 is characterized in that: the inside of the reformer is purged by the material gas when the hydrogen generator stops operating; and the cooling step of the reformer and the heat recovery operation by the first heat medium are executed until the temperature of the reformer reaches the purge temperature.

Since a hardware configuration of the hydrogen generator of Modification Example 1 may be the same as that of the hydrogen generator 100 shown in FIG. 1, an explanation thereof is omitted. In addition, since the hydrogen generating operation and the operations of the start-up processing in the present modification example may be the same as those of the hydrogen generator 100 described as above, explanations thereof are omitted.

Figure 4:
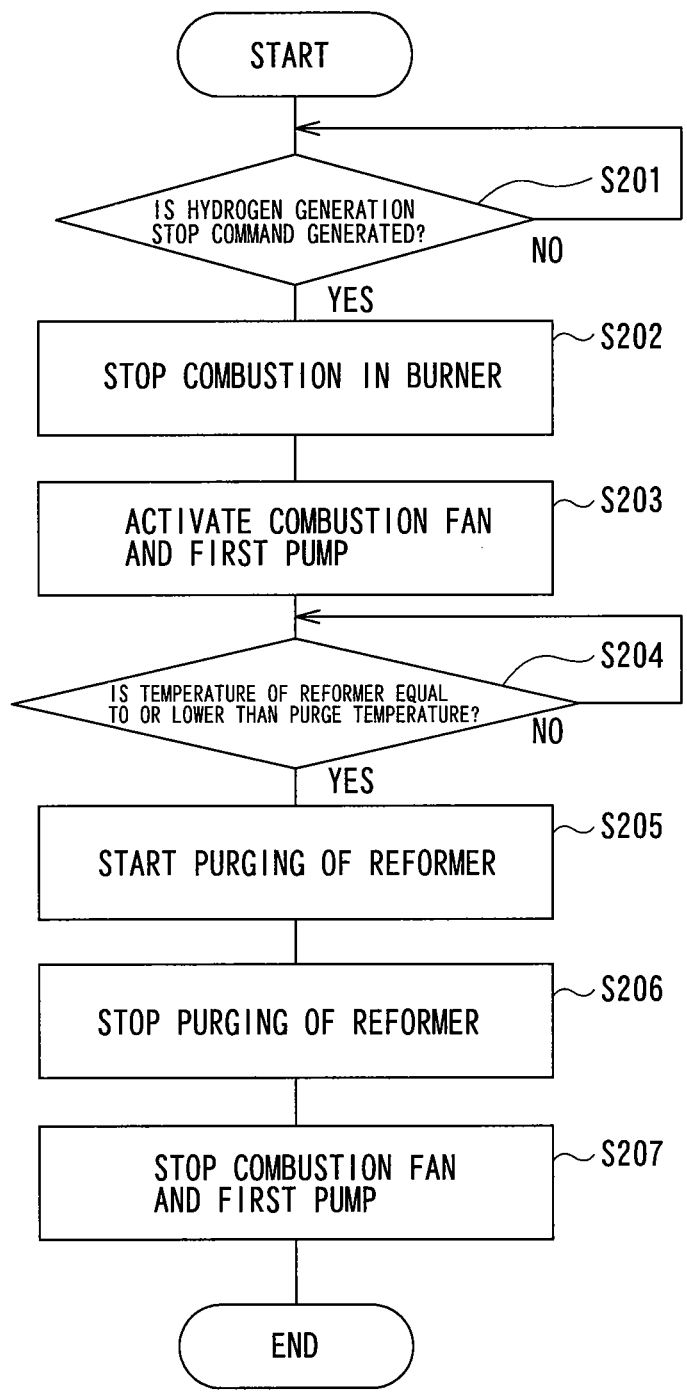
FIG. 4 is a flow chart showing one example of operations carried out when the hydrogen generator according to Modification Example 1 of Embodiment 1 of the present invention stops operating.

FIG. 4 is a flow chart schematically showing operations carried out when the hydrogen generator of Modification Example 1 of Embodiment 1 of the present invention stops operating. Hereinafter, the operations of the stop processing of the hydrogen generator of the present modification example will be explained in reference to FIG. 4. The following operations are executed such that the controller controls respective devices of the hydrogen generator.

Whether or not the hydrogen generation stop command is generated is determined in the hydrogen generating operation of the hydrogen generator (Step S201). In a case where the hydrogen generation stop command is generated, the first on-off valve 118 and the second on-off valve 119 are closed. Thus, the supply of each of the material gas and the reforming water stops. Moreover, the fifth on-off valve 132 is closed. Thus, the combustion in the combustor 104 (burner) stops (Step S202).

After the combustion in the burner stops, the operation of the combustion fan 106 is executed to cool down the reformer 102, and the operation of the first pump 112 is executed (Step S203: cooling step). With this, the reformer 102 is cooled down by the air supplied by the combustion fan 106, and the heat of the exhaust air having cooled down the reformer 102 is recovered by the first heat medium.

Next, the temperature of the reformer 102 is detected by the third temperature detector 138, and whether or not the detected temperature is equal to or lower than the purge temperature (for example, 300° C. or lower) is determined (Step S204).

In a case where the result of the determination in Step S204 is YES, the purging operation starts (Step S205). To be specific, the first on-off valve 118 and the fifth on-off valve 132 open and the booster pump 116 is activated to supply the material gas to the reformer 102. The material gas having been discharged from the reformer is supplied through the first bypass passage 126 to the combustor 104 and is combusted in the combustor 104.

When the purging operation starts, an elapsed time is measured. Then, whether or not the elapsed time is equal to or longer than a predetermined purging operation time is determined. In a case where the result of the determination is YES, the operation of the booster pump 116 stops and the first on-off valve 118 and the fifth on-off valve 132 are closed to stop the purging operation (Step S206).

When the purging operation stops, the operation of each of the combustion fan 106 and the first pump 112 stops (Step S207). Thus, the stop operation is terminated (END).

MODIFICATION EXAMPLE 2

The hydrogen generator of Modification Example 2 is characterized in that: the cooling step, the heat recovery operation, and the subsequent purging operation, which are the same as those of the hydrogen generator of Modification Example 1, are executed when the hydrogen generator abnormally stops.

Defined as the abnormalities in the present modification example are device failures (for example, a failure of the temperature detector, a failure of the CO sensor, and a failure of the combustion air supplying device), gas leakage abnormality (for example, combustible gas leakage abnormality), and a detected temperature abnormality of the temperature detector (for example, excessively increased or decreased reforming temperature). These abnormalities are just examples. A part of the abnormalities may be defined as the abnormality, and an abnormality other than these abnormalities may be defined as the abnormality.

One example of the abnormality which may be the failure of the temperature detector is that a detected value of the third temperature detector 138 that is, for example, a thermistor indicates short-circuit or disconnection. In the present modification example, the cooling step, the heat recovery operation, and the subsequent purging operation, which are the same as those in Modification Example 1, are executed as an abnormal stop processing corresponding to this abnormality.

One example of the abnormality which may be the failure of the CO sensor is that a detected value of a contact burning-type sensor that is the CO sensor, not shown, provided at the combustor 104 indicates disconnection of an electrical resistor. In the present modification example, the cooling step, the heat recovery operation, and the subsequent purging operation, which are the same as those in Modification Example 1, are executed as the abnormal stop processing corresponding to this abnormality.

One example of the abnormality which may be the failure of the combustion air supplying device is that the number of rotations of the combustion fan 106 is out of an allowable range with respect to the manipulated variable from the controller 114 (for example, even if the manipulated variable is increased with respect to a set manipulated variable corresponding to the target number of rotations, the target number of rotations of the combustion fan 106 is not accomplished even after a predetermined period of time or more). Such abnormality may occur in a case where the desired number of rotations with respect to a command value of the manipulated variable cannot be obtained due to the deterioration of a motor. Therefore, such abnormality may be regarded as the failure of the combustion fan 106. In the present modification example, the cooling step, the heat recovery operation, and the subsequent purging operation, which are the same as those in Modification Example 1, are executed as the abnormal stop processing corresponding to this abnormality.

The combustible gas leakage abnormality indicates that a combustible gas sensor provided in the hydrogen generator detects the combustible gas. One example is that the combustible gas (such as the material gas or the fuel gas) leaks in a package, and the combustible gas sensor detects the combustible gas. In the present embodiment, the cooling step, the heat recovery operation, and the subsequent purging operation, which are the same as those in Modification Example 1, are executed as the abnormal stop processing corresponding to this abnormality.

Regarding the failures of respective abnormality detectors among the abnormalities explained above, an abnormality determiner, not shown, incorporated in the controller 114 serves as the abnormality detector. Regarding the abnormalities other than the failures of the above detectors, a combination of the abnormality determiner and a detector configured to output a detected value that is a determination target when determining the abnormality serves as the abnormality detector.

Here, when the above abnormality is detected in the hydrogen generator of the present modification example, the hydrogen generation stop command is output. Then, the stop processing that is the same as that of Steps 5201 to 5207 shown in FIG. 4 is carried out. After the stop processing is terminated, the hydrogen generator shifts to a start-up not-allowing state (END).

The start-up not-allowing state denotes a state in which even if the start-up request is generated, the start-up of the fuel cell system is not allowed, and the controller does not output the start-up command. For example, the start-up not-allowing state denotes a state in which even if a user operates a key operating portion of a remote controller for the start-up of the hydrogen generator to request the operation start, the controller does not carry out the start-up processing of the hydrogen generator.

MODIFICATION EXAMPLE 3

In Modification Example 3, in the raw material purging operation (purging operation) of purging the inside of the reformer 102 by the raw material after the cooling step, the gas discharged from the reformer 102 is combusted in the combustor 104, and the first pump 112 is activated. The controller 114 increases the manipulated variable of the first pump 112 in the raw material purging operation as compared to in the cooling step.

Other than the above, the configuration and operations of the hydrogen generator of Modification Example 3 may be the same as those of each of Modification Examples 1 and 2, so that detailed explanations thereof are omitted.

MODIFICATION EXAMPLE 4

Modification Example 4 is characterized in that in the cooling step of the hydrogen generator of Embodiment 1, the potential heat of the exhaust air having cooled down the reformer is recovered in a secondary cooling system.

Since the hydrogen generating operation and the start-up processing in Modification Example 4 may be the same as those of the hydrogen generator 100 of Embodiment 1, explanations thereof are omitted.

Figure 5:
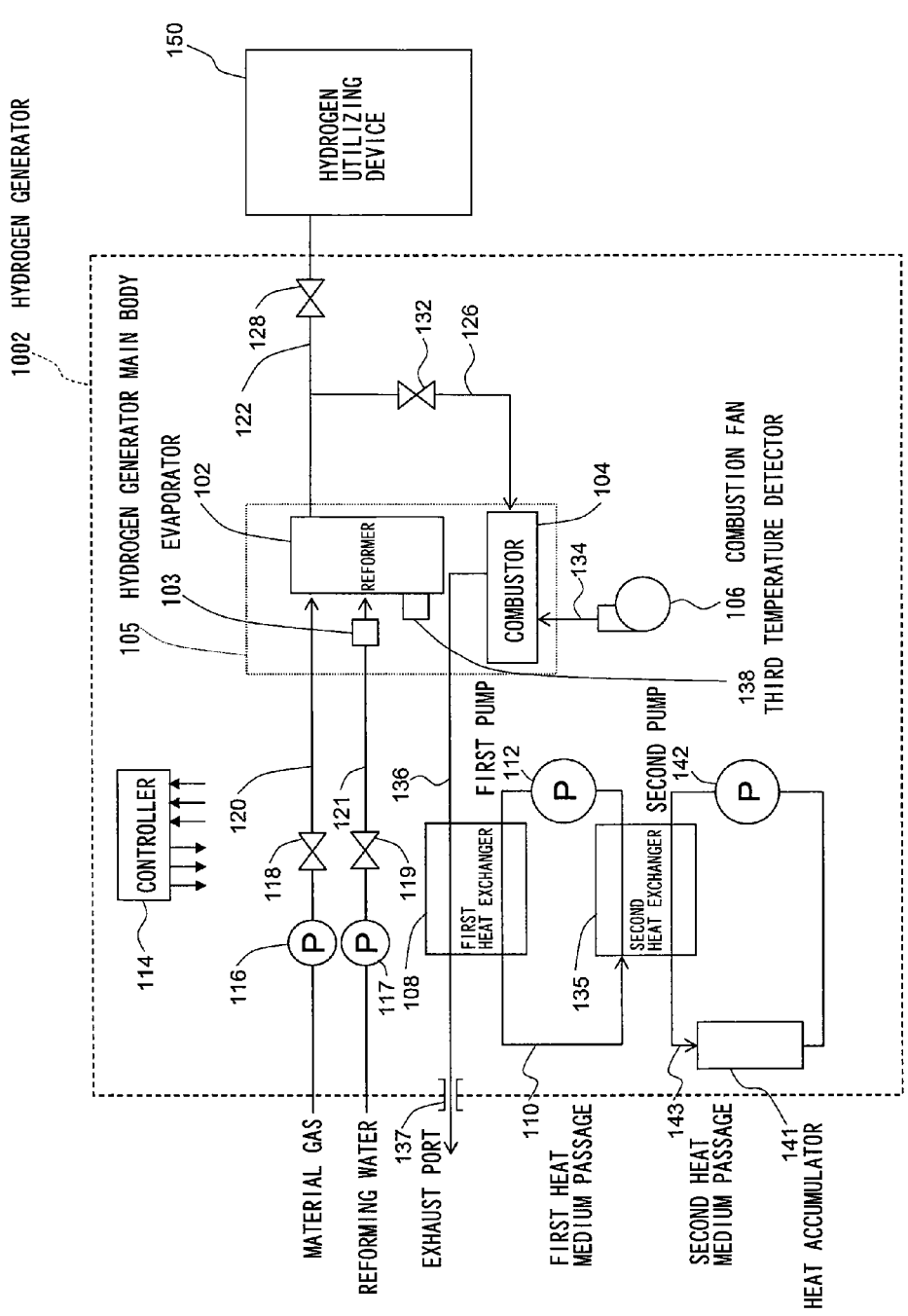
FIG. 5 is a block diagram showing one example of a schematic configuration of the hydrogen generator according to Modification Example 4 of Embodiment 1 of the present invention.

FIG. 5 is a block diagram showing one example of a schematic configuration of the hydrogen generator 1002 of the present modification example. In FIG. 5, the same reference signs and names are used for the same components as in FIG. 1, and detailed explanations thereof are omitted.

The second heat exchanger 135 is a heat exchanger configured to recover the heat from the first heat medium in the first heat medium passage 110. The second heat medium passage 143 is a passage through which the second heat medium flows, the second heat medium receiving the heat recovered from the first heat medium in the second heat exchanger 135. The second pump 142 is a pump configured to cause the second heat medium in the second heat medium passage 143 to flow.

In the hydrogen generator 1002 of Modification Example 4, not only the first pump but also the second pump are activated in the cooling step, and the potential heat of the exhaust air having cooled down the reformer 102 is finally recovered by the second heat medium and stored in the heat accumulator 141.

The configuration of the hydrogen generator in the present modification example and the heat recovery operation in the cooling step of the present modification example may be applied to the hydrogen generators of Modification Examples 1 to 3. Moreover, it is preferable that the first pump 112 and the second pump 142 be activated even in the case of executing the raw material purging operation as with the hydrogen generators of Modification Examples 1 to 3. Moreover, it is preferable that as with the hydrogen generator of Modification Example 3, the controller 114 control such that the manipulated variable of each of the first pump 112 and the second pump 142 in the raw material purging operation is larger than the manipulated variable of each of the first pump 112 and the second pump 142 in the cooling step.

MODIFICATION EXAMPLE 5

The hydrogen generator of Modification Example 5 is characterized by including: the bypass passage configured to bypass the heat accumulator; the first switching device configured to switch the destination to which the first heat medium flows, between the heat accumulator and the bypass passage; and the first temperature detector configured to detect the temperature of the first heat medium. The hydrogen generator of Modification Example 5 is characterized in that in the cooling step, the state where the first switching device causes the first heat medium to flow in the bypass passage is maintained until the temperature detected by the first temperature detector becomes equal to or higher than the first threshold. Since the hydrogen generating operation and the operations in the start-up processing in the present modification example may be the same as those of the hydrogen generator 100, explanations thereof are omitted.

Figure 6:
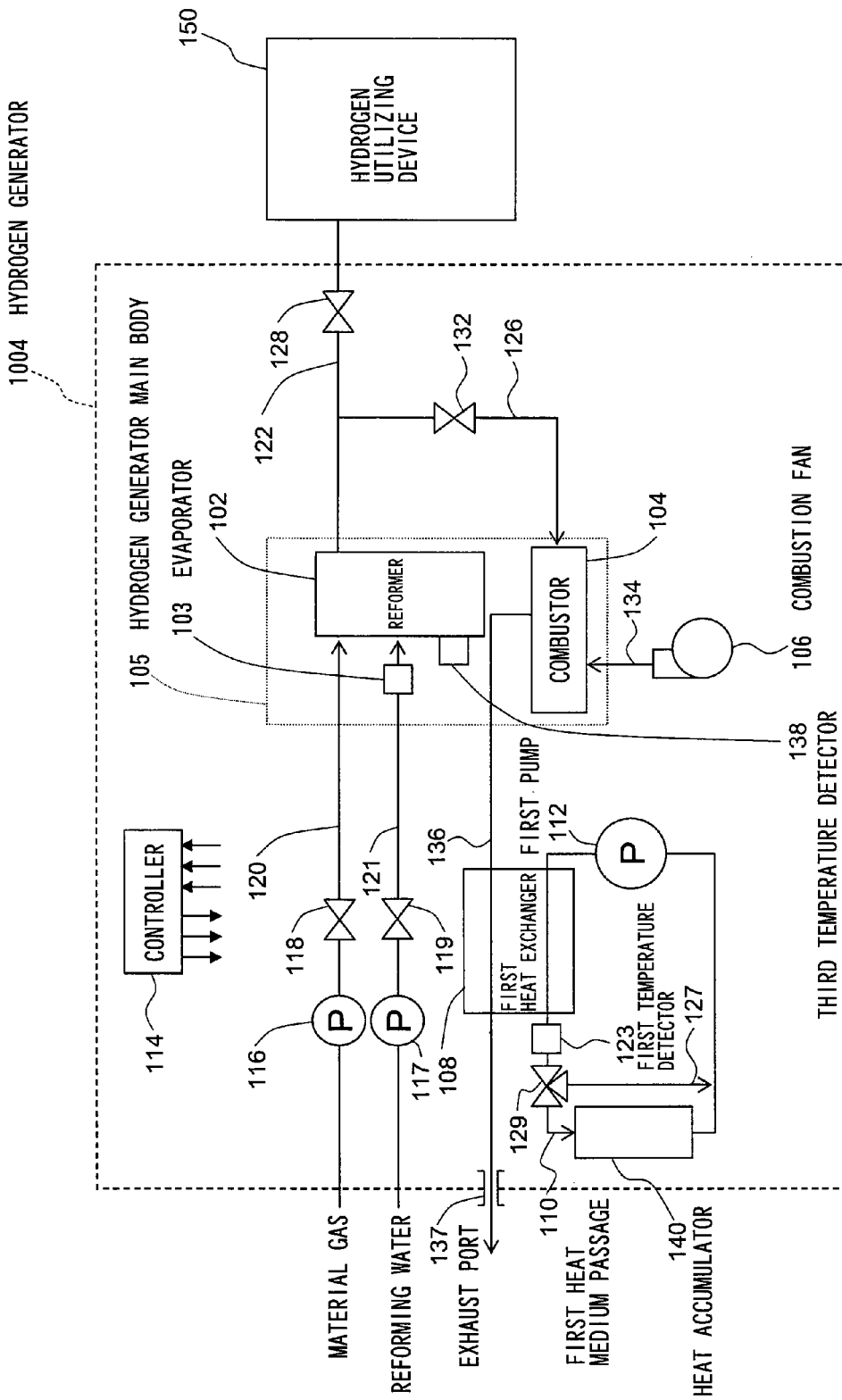
FIG. 6 is a block diagram showing one example of a schematic configuration of the hydrogen generator according to Modification Example 5 of Embodiment 1 of the present invention.

FIG. 6 is a block diagram showing one example of a schematic configuration of the hydrogen generator 1004 of the present modification example. In FIG. 6, the same reference signs and names are used for the same components as in FIG. 1, and detailed explanations thereof are omitted.

The heat accumulator 140 is a heat accumulator configured to store the first heat medium having passed through the first heat exchanger 108.

The second bypass passage 127 is a passage which connects the first heat medium passage 110 located upstream of the first heat exchanger 108 and the first heat medium passage 108 located downstream of the first heat exchanger 108 and bypasses the heat accumulator 140. The three-way valve 129 (first switching device) switches the destination to which the first heat medium having passed through the first heat exchanger 108 flows, between the heat accumulator 140 and the second bypass passage 127. The first temperature detector 123 detects the temperature of the first heat medium having passed through the first heat exchanger 108 and transmits the detection result to the controller 114.

In the present modification example, the controller 114 controls such that in the cooling step, the first pump 112 operates, and the state where the three-way valve 129 causes the first heat medium to flow in the second bypass passage 127 is maintained until the temperature detected by the first temperature detector becomes equal to or higher than the first threshold (for example, 65° C.). Here, the "first threshold" is a lower storage temperature limit (lower hot water temperature limit in a case where the heat accumulator is the hot water tank) for, for example, preventing the temperature of the heat medium supplied to the heat accumulator from excessively decreasing. With this, the low-temperature first heat medium having recovered the exhaust heat from the exhaust air in the cooling step can be prevented from flowing into the heat accumulator. Thus, the temperature of the inside of the heat accumulator can be prevented from decreasing.

The configuration of the hydrogen generator in the present modification example and the switching control of the second bypass passage 127 in the cooling step in the present modification example may be applied to the hydrogen generators of Embodiment 1 and Modification Examples 1 to 4.

MODIFICATION EXAMPLE 6

The hydrogen generator of Modification Example 6 is different from the hydrogen generator of Modification Example 5 and is characterized in that the potential heat of the exhaust air having cooled down the reformer in the cooling step of the hydrogen generator is recovered in the secondary cooling system. Specifically, the hydrogen generator of Modification Example 6 is characterized by including: the bypass passage configured to bypass the heat accumulator; the second switching device configured to switch the destination to which the second heat medium flows, between the heat accumulator and the bypass passage; and the second temperature detector configured to detect the temperature of the second heat medium. The hydrogen generator of Modification Example 6 is characterized in that in the cooling step, the state where the second switching device causes the second heat medium to flow in the bypass passage is maintained until the temperature detected by the second temperature detector becomes equal to or higher than the first threshold. Since the hydrogen generating operation and the operations in the start-up processing in the present modification example may be the same as those of the hydrogen generator 100, explanations thereof are omitted.

Figure 7:
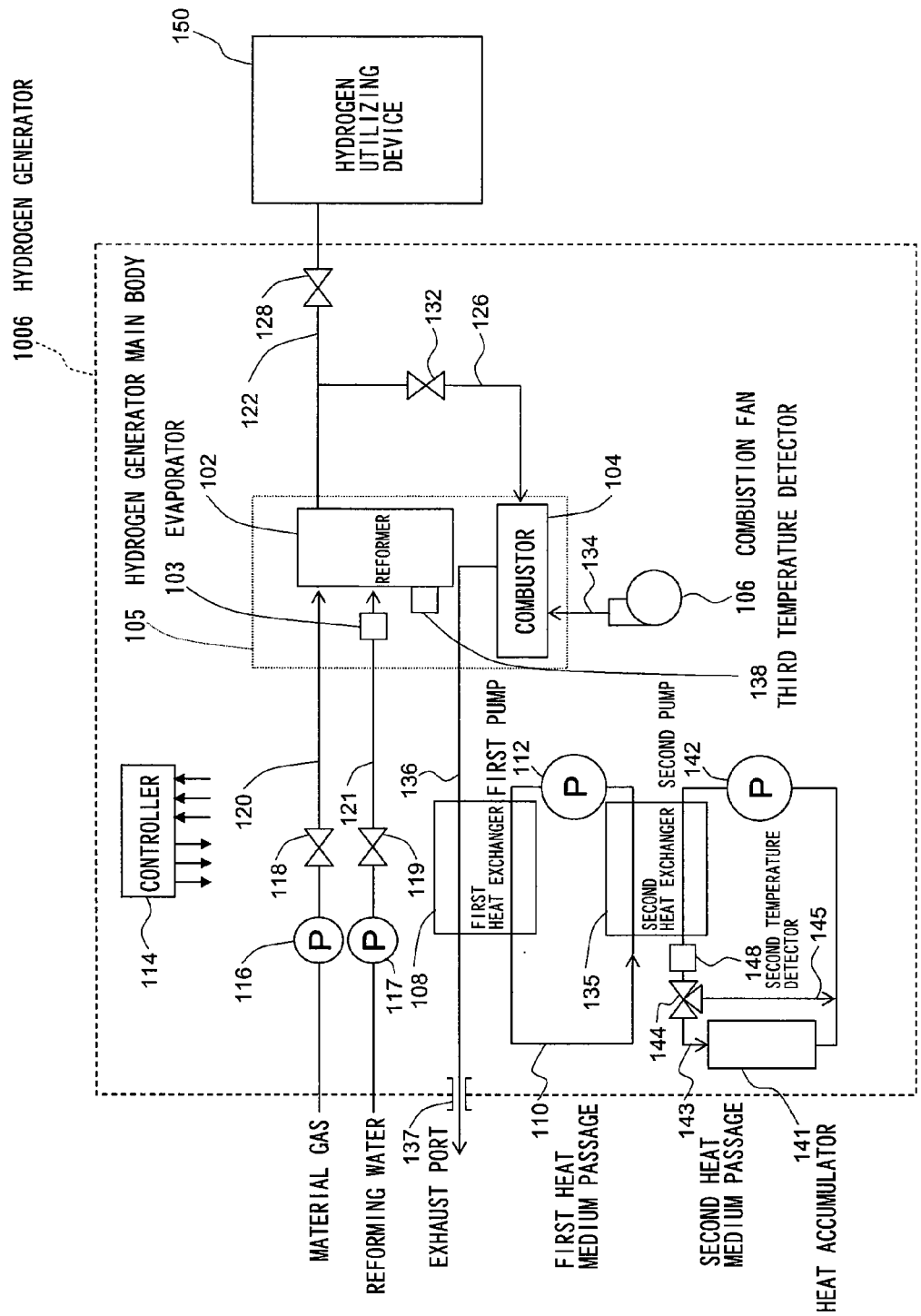
FIG. 7 is a block diagram showing one example of a schematic configuration of the hydrogen generator according to Modification Example 6 of Embodiment 1 of the present invention.

FIG. 7 is a block diagram showing one example of a schematic configuration of the hydrogen generator 1006 of the present modification example. In FIG. 7, the same reference signs and names are used for the same components as in FIG. 5, and detailed explanations thereof are omitted.

The heat accumulator 141 is a heat accumulator configured to store the second heat medium having passed through the second heat exchanger 135. The third bypass passage 145 is a passage which connects the second heat medium passage 143 located upstream of the second heat exchanger 135 and the second heat medium passage 143 located downstream of the second heat exchanger 135 and bypasses the heat accumulator 141. The three-way valve 144 (second switching device) switches the destination to which the second heat medium having passed through the second heat exchanger 135 flows, between the heat accumulator 141 and the third bypass passage 145. The second temperature detector 148 detects the temperature of the second heat medium having passed through the second heat exchanger 135 and transmits the detection result to the controller 114.

In the present modification example, the controller 114 controls such that in the cooling step, the state where the three-way valve 144 causes the first heat medium to flow in the third bypass passage 145 is maintained until the temperature detected by the second temperature detector 148 becomes equal to or higher than the first threshold (for example, 65° C.). With this, the low-temperature first heat medium having recovered the exhaust heat from the exhaust air in the cooling step can be prevented from flowing into the heat accumulator. Thus, the temperature of the inside of the heat accumulator can be prevented from decreasing.

The configuration of the hydrogen generator in the present modification example and the switching control of the third bypass passage 145 in the cooling step in the present modification example may be applied to the hydrogen generators of Embodiment 1 and Modification Examples 1 to 5.

MODIFICATION EXAMPLE 7

The hydrogen generator of Modification Example 7 is characterized by carrying out the first heat recovery operation and the second heat recovery operation in this order in the cooling step of the reformer. In the first heat recovery operation, the manipulated variable of the first pump is controlled based on the temperature detected by the first temperature detector. In the second heat recovery operation, the manipulated variable of the first pump is forcibly controlled to be equal to or larger than a predetermined value regardless of the temperature detected by the first temperature detector. Other than the above, the device configuration and operations of the hydrogen generator of the present modification example may be the same as those of Modification Example 5, so that explanations thereof are omitted.

Figure 8:
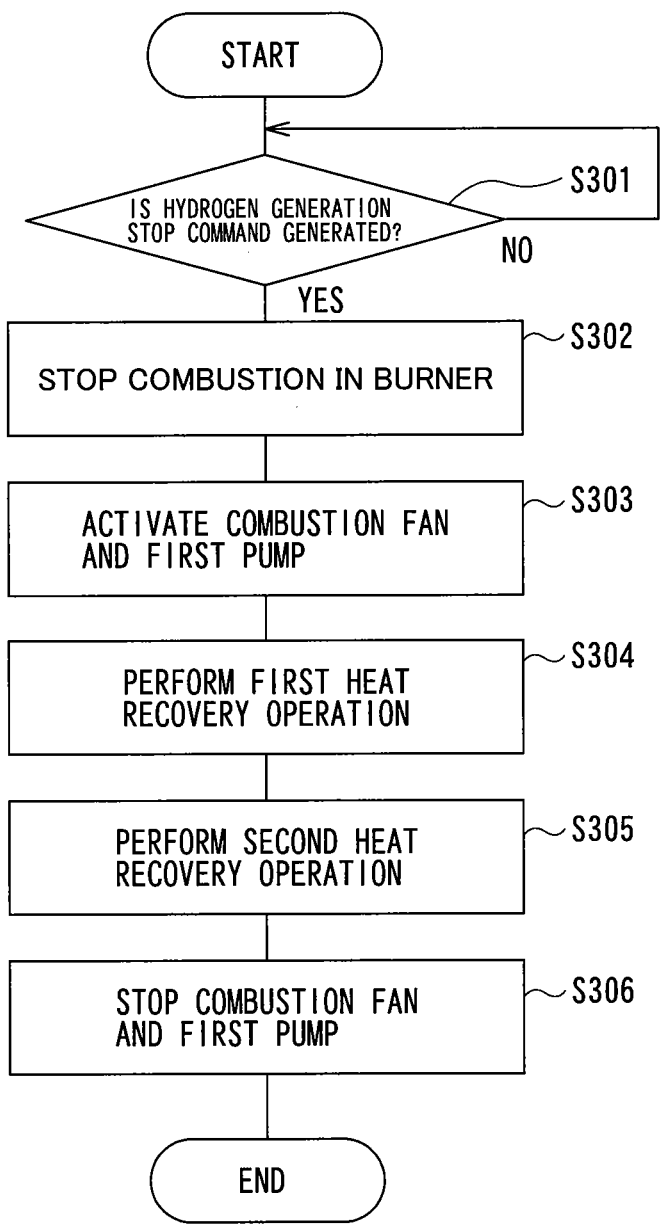
FIG. 8 is a flow chart schematically showing operations carried out when the hydrogen generator according to Modification Example 7 of Embodiment 1 of the present invention stops operating.

FIG. 8 is a flow chart schematically showing operations carried out when the hydrogen generator of the present modification example stops operating. Hereinafter, the operations of the stop processing of the hydrogen generator of the present modification example will be schematically explained in reference to FIG. 8. The following operations are executed such that the controller controls respective devices of the hydrogen generator.

Whether or not the hydrogen generation stop command is generated is determined in the hydrogen generating operation of the hydrogen generator (Step S301). In a case where the hydrogen generation stop command is generated, the operation of each of the booster pump 116 and the reforming water pump 117 stops, and the first on-off valve 118 and the second on-off valve 119 are closed. Thus, the supply of each of the material gas and the reforming water stops. Moreover, the fifth on-off valve 132 is closed. Thus, the combustion in the combustor 104 (burner) stops (Step S302).

After the combustion in the burner stops, the operation of each of the combustion fan 106 and the first pump 112 is executed (Step S303: cooling step). With this, the reformer 102 is cooled down by the air supplied by the combustion fan 106, and the heat recovery operation of recovering by the first heat medium the potential heat of the exhaust air having cooled down the reformer 104 is carried out.

In the cooling step of Step S303, first, the first heat recovery operation is executed (Step S304). In the first heat recovery operation, the manipulated variable (manipulated variable transmitted from the controller 114 to the first pump 112) of the first pump 112 is controlled based on the temperature detected by the first temperature detector 123. More specifically, the controller 114 carries out feedback control of the manipulated variable of the first pump 112 using the temperature detected by the first temperature detector 123 such that the temperature detected by the first temperature detector 123 becomes equal to or higher than the first threshold (for example, 65° C.). In a case where the temperature detected by the first temperature detector 123 is lower than the first threshold, the amount of heat exchange is increased by reducing the manipulated variable to lower the flow rate. Thus, the temperature of the first heat medium is increased.

When the temperature decrease of the reformer proceeds by the first heat recovery operation, the second heat recovery operation is executed (Step S305). In the second heat recovery operation, the manipulated variable of the first pump 112 is forcibly controlled to be equal to or larger than a predetermined value regardless of the temperature detected by the first temperature detector 123. By the above control, as compared to conventional hydrogen generators, the possibility that the person near the exhaust port may get burned can be reduced while considering the utilization of the stored heat recovered by the first heat medium.

The switching from the first heat recovery operation to the second heat recovery operation may be carried out when, for example, the temperature of the reformer has decreased to a predetermined temperature (for example, 550° C.) based on the temperature of the reformer detected by the third temperature detector 138.

In the present modification example, the three-way valve 129 and the second bypass passage 127 may be omitted.

In the present modification example, in a case where the temperature of the first heat medium can be controlled to a temperature appropriate for supplying the first heat medium to the heat accumulator, the first heat medium is stored in the heat accumulator. In contrast, in a case where the temperature of the first heat medium cannot be controlled as above, the cooling is preferentially executed.

MODIFICATION EXAMPLE 8

The hydrogen generator of Modification Example 8 is characterized in that: in a case where the temperature detected by the first temperature detector 123 is equal to or higher than the first threshold in the second heat recovery operation, the controller switches the three-way valve 129 such that the three-way valve 129 causes the first heat medium to flow in the heat accumulator 140; and in a case where the temperature detected by the first temperature detector 123 is equal to or lower than the second threshold that is smaller than the first threshold in the second heat recovery operation, the controller switches the three-way valve 129 such that the three-way valve 129 causes the first heat medium to flow in the bypass passage. Since the other device configuration and operations in Modification Example 8 may be the same as those in Modification Example 7, detailed explanations thereof are omitted. With this, in the second heat recovery operation, the temperature of the first heat medium supplied to the heat accumulator is controlled to be an appropriate temperature. Thus, the low-temperature first heat medium is prevented from flowing into the heat accumulator.

Since the "second threshold" is set as a value that is smaller than the first threshold, it is possible to prevent the three-way valve from being frequently switched in accordance with the change in temperature detected by the first temperature detector.

MODIFICATION EXAMPLE 9

The hydrogen generator of Modification Example 9 is different from that of Modification Example 7 and is characterized in that the first and second heat recovery operations in the cooling step of the hydrogen generator are executed using the secondary cooling system. Specifically, the hydrogen generator of Modification Example 9 is characterized by carrying out the first heat recovery operation and the second heat recovery operation in this order. In the first heat recovery operation, the manipulated variable of the second pump 142 is controlled based on the temperature detected by the second temperature detector 148. In the second heat recovery operation, the manipulated variable of the second pump 142 is forcibly controlled to be equal to or larger than a predetermined value regardless of the temperature detected by the second temperature detector 148. Other than the above, the device configuration and operations of the hydrogen generator in the present modification example may be the same as those of Modification Example 6, so that explanations of common portions are omitted.

The operations carried out when the hydrogen generator of the present modification example stops operating are such that in the explanation of Modification Example 7, the first temperature detector 123 is replaced with the second temperature detector 148, the first pump 112 is replaced with the second pump 142, and the first pump 112 is operated together with the operation of the second pump 142. The other detailed explanations are omitted. It is preferable that in at least the second heat recovery operation, as with the second pump 142, the first pump 112 be forcibly controlled such that the manipulated variable thereof becomes equal to or larger than a predetermined value. The "predetermined value" may be the same as or different from the predetermined value used when the manipulated variable of the first pump is controlled to be equal to or larger than the predetermined value in the second heat recovery operation.

In accordance with the hydrogen generator of the present modification example, as compared to conventional hydrogen generators, the possibility that the person near the exhaust port may get burned can be reduced while considering the utilization of the stored heat recovered by the second heat medium.

MODIFICATION EXAMPLE 10

The hydrogen generator of Modification Example 10 is characterized in that: in a case where the temperature detected by the second temperature detector 148 is equal to or higher than the first threshold in the second heat recovery operation, the controller switches the three-way valve 144 such that the three-way valve 144 causes the second heat medium to flow in the heat accumulator 141; and in a case where the temperature detected by the second temperature detector 148 is equal to or lower than the second threshold that is smaller than the first threshold, the controller switches the three-way valve 144 such that the three-way valve 144 causes the second heat medium to flow in the third bypass passage 145. Since the other device configuration and operations in Modification Example 10 may be the same as those in Modification Example 9, detailed explanations thereof are omitted.

In accordance with the hydrogen generator of the present modification example, in the second heat recovery operation, the temperature of the second heat medium supplied to the heat accumulator is controlled to an appropriate temperature. Thus, the low-temperature second heat medium is prevented from flowing into the heat accumulator.

MODIFICATION EXAMPLE 11

The device configuration of a hydrogen generator 1008 of Modification Example 11 is different from that of the hydrogen generator of Modification Example 5 in that a radiator 131 is disposed on the second bypass passage 127. The other components of the hydrogen generator 1008 of Modification Example 11 are the same as those of the hydrogen generator 1004 of Modification Example 5.

Figure 9:
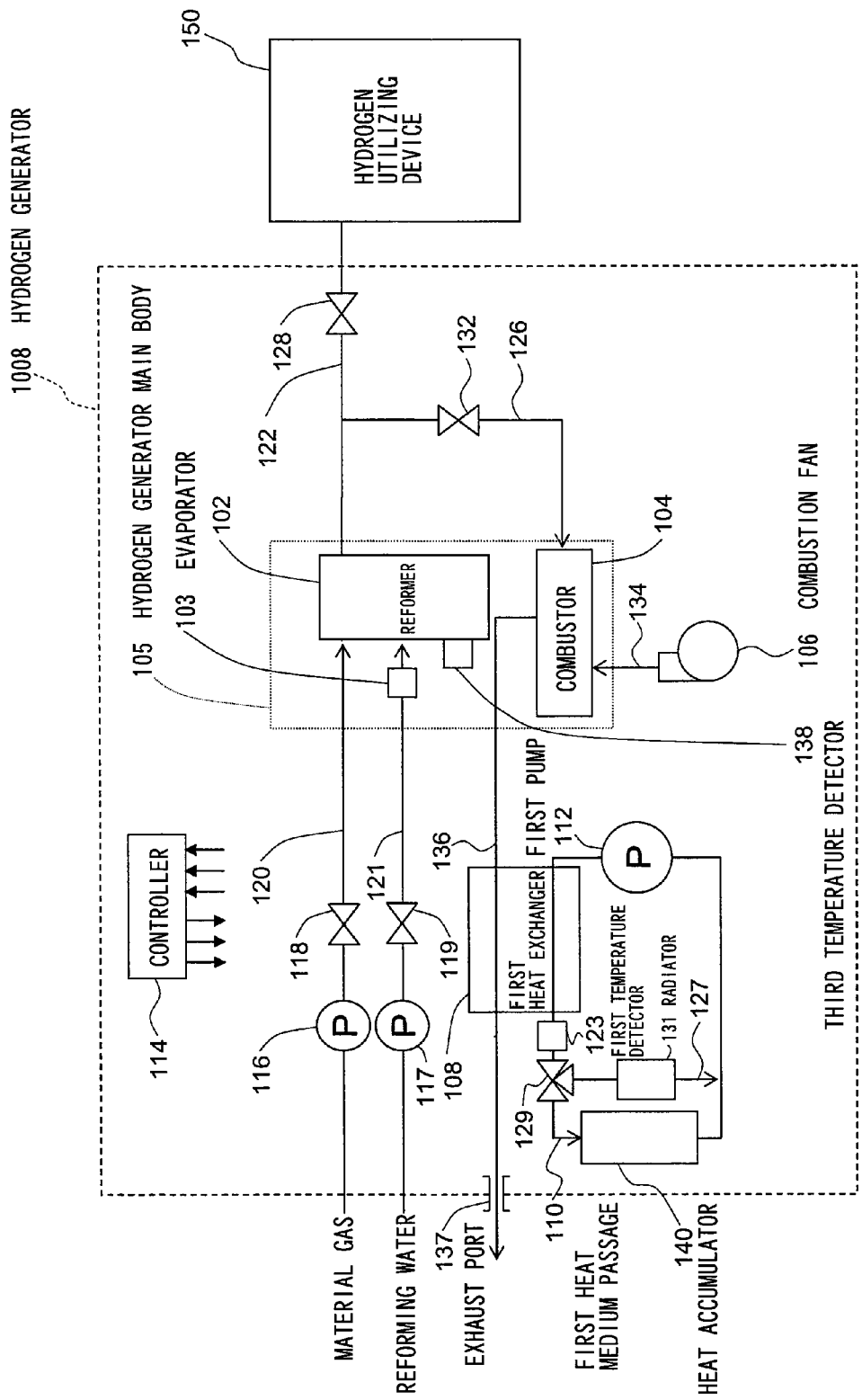
FIG. 9 is a block diagram showing one example of a schematic configuration of the hydrogen generator according to Modification Example 11 of Embodiment 1 of the present invention.

FIG. 9 is a block diagram showing one example of a schematic configuration of the hydrogen generator 1008 of the present modification example. In FIG. 9, the same reference signs and names are used for the same components as in FIG. 6, and detailed explanations thereof are omitted.

The radiator 131 is disposed on the second bypass passage 127 and is configured to execute an active cooling operation.

Here, the "active cooling operation" is not a passive cooling operation, such as natural heat radiation to atmosphere, but is an operation, such as a cooling operation by a fan or a cooling operation by circulating water, of supplying a cooling medium (such as air) to a position (such as a position around the first heat medium passage 110) where the first heat medium can be cooled down.

Next, the cooling step of the reformer when the hydrogen generator of the present modification example stops operating will be explained. In the cooling step, the combustion fan 106 and the first pump 112 are activated. Thus, the heat is recovered by the first heat medium from the exhaust air having cooled down the reformer 102. Then, in the cooling step, the state where the three-way valve 129 causes the first heat medium to flow in the second bypass passage 127 is maintained, and the cooling operation of the radiator 131 is in an ON state. Thus, the first heat medium heated through the first heat exchanger flows through the bypass passage 127 to be cooled down through the radiator 131.

The hydrogen generator of the present modification example may be configured such that the heat recovery operation in the cooling step is executed in the same manner as in Modification Example 7. Specifically, as a first exhaust heat recovery operation, the three-way valve 129 is switched such that the three-way valve 129 causes the first heat medium to flow in the heat accumulator 140, and the manipulated variable of the first pump 123 is controlled based on the temperature detected by the first temperature detector 123. As a subsequent second exhaust heat recovery operation, the state where the three-way valve 129 causes the first heat medium to flow in the second bypass passage 127 is maintained, and the cooling operation of the radiator 131 is executed.

MODIFICATION EXAMPLE 12

The device configuration of the hydrogen generator 1008 of Modification Example 12 is different from that of the hydrogen generator of Modification Example 11 in that the radiator 131 is not disposed on the second bypass passage 127 but is disposed on a first branching passage 133 which does not bypass the heat accumulator 140 and branches from the first heat medium passage 110 and joins the first heat medium passage 110. The other components of the hydrogen generator 1008 of Modification Example 12 are the same as those of the hydrogen generator 1006 of Modification Example 11.

Figure 10:
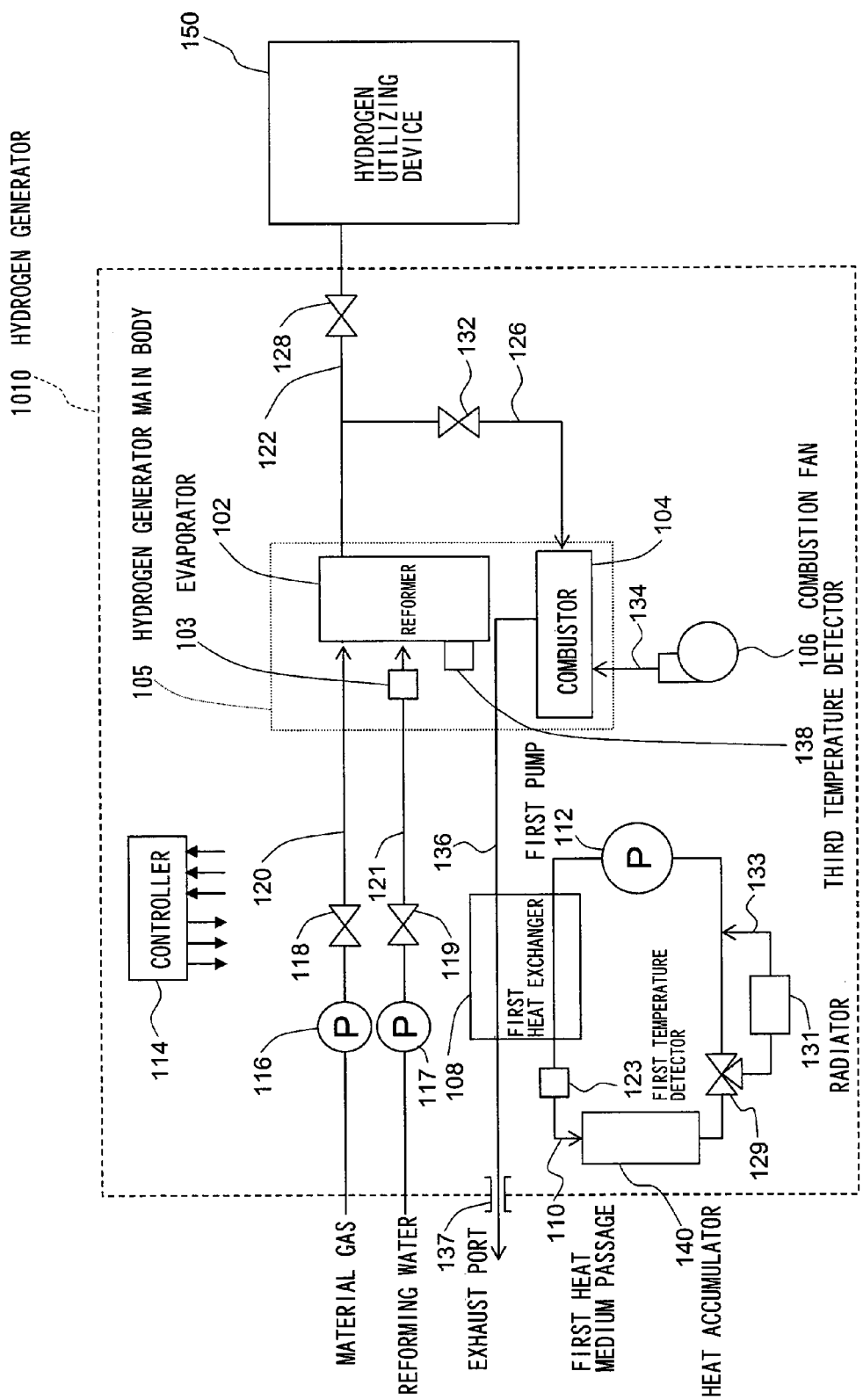
FIG. 10 is a block diagram showing one example of a schematic configuration of the hydrogen generator according to Modification Example 12 of Embodiment 1 of the present invention.

FIG. 10 is a block diagram showing one example of a schematic configuration of a hydrogen generator 1010 of Modification Example 12 of Embodiment 1 of the present invention. In FIG. 10, the same reference signs and names are used for the same components as in FIG. 6, and detailed explanations thereof are omitted.

The radiator 131 is disposed on the first branching passage 133 and is configured to execute the active cooling operation as with Modification Example 11. The first branching passage 133 is a passage branching from the first heat medium passage 110. In the present modification example, the first branching passage 133 does not bypass the heat accumulator 140 and branches from the first heat medium passage 110 and joins the first heat medium passage 110.

Since the heat recovery operation in the cooling step of the hydrogen generator of the present modification example is the same as that of Modification Example 11, an explanation thereof is omitted. The position of the radiator disposed on the first heat medium passage is not limited to Modification Examples 11 and 12. The radiator may be disposed on anywhere as long as it is disposed on the first branching passage branching from the first heat medium passage.

MODIFICATION EXAMPLE 13

The device configuration of a hydrogen generator 1012 of Modification Example 13 corresponds to a case where the heat recovery operation in the cooling step of the hydrogen generator of Modification Example 11 is executed in the secondary cooling system. Specifically, Modification Example 13 is different from Modification Example 6 in that a radiator 146 is disposed on the third bypass passage 145. The other components of the hydrogen generator 1012 of Modification Example 13 are the same as those of the hydrogen generator 1006 of Modification Example 6.

Figure 11:
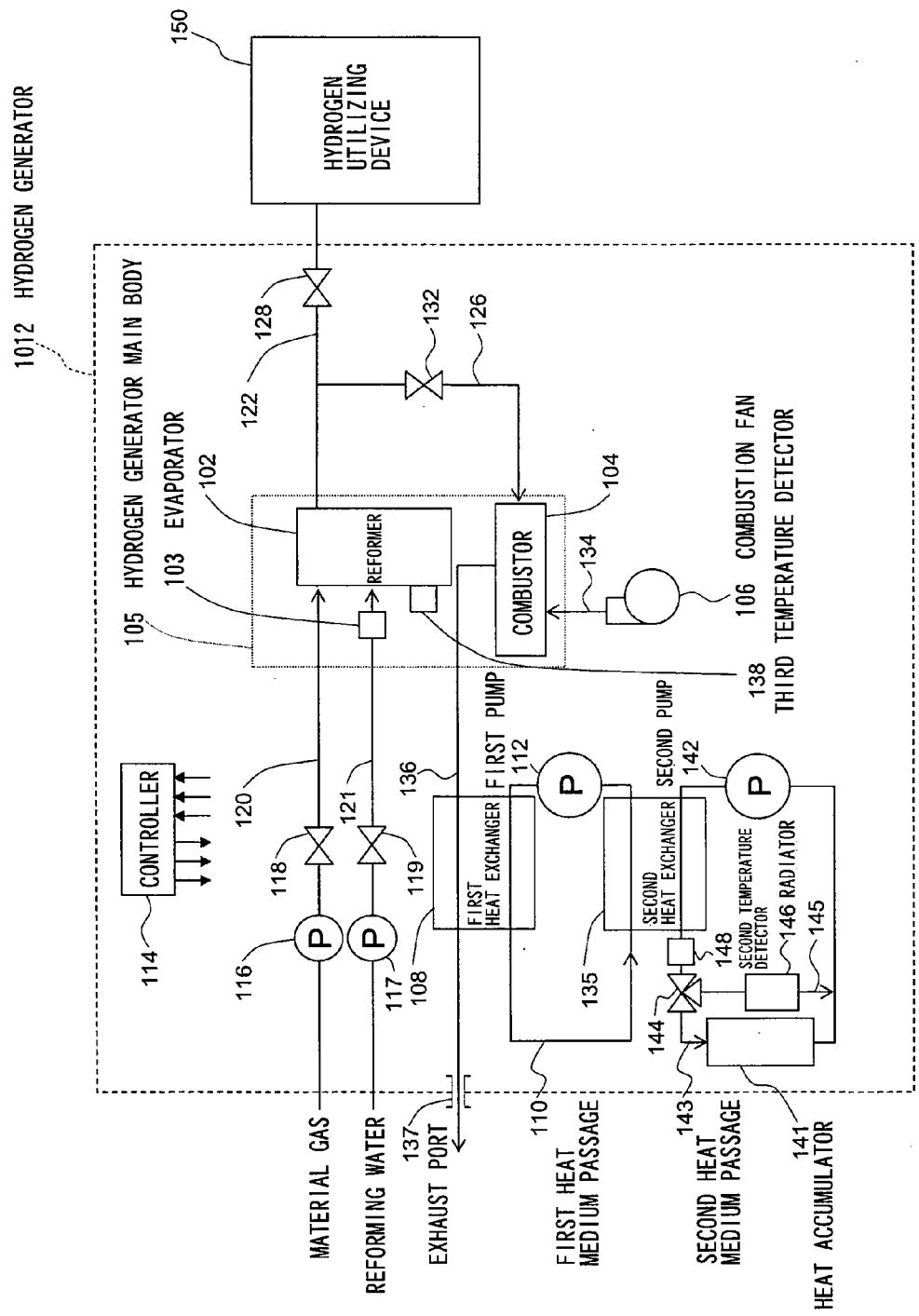
FIG. 11 is a block diagram showing one example of a schematic configuration of the hydrogen generator according to Modification Example 13 of Embodiment 1 of the present invention.

FIG. 11 is a block diagram showing one example of a schematic configuration of the hydrogen generator 1012 of the present modification example. In FIG. 11, the same reference signs and names are used for the same components as in FIG. 7, and detailed explanations thereof are omitted.

The radiator 146 is disposed on the third bypass passage 145 and is configured to execute the active cooling operation.

The operation carried out when the hydrogen generator of the present modification example stops operating, that is, the heat recovery operation in the cooling step is such that in the explanation of Modification Example 11, the first temperature detector 123 is replaced with the second temperature detector 148, the first pump 112 is replaced with the second pump 142, the three-way valve 129 is replaced with the three-way valve 144, the second bypass passage 127 is replaced with the third bypass passage 145, and the first pump 112 is operated together with the operation of the second pump 142.

The other detailed explanations are omitted. It is preferable that in at least the second heat recovery operation, as with the second pump 142, the first pump 112 be forcibly controlled such that the manipulated variable thereof becomes equal to or larger than a predetermined value. The "predetermined value" may be the same as or different from the predetermined value used when the manipulated variable of the first pump is controlled to be equal to or larger than the predetermined value in the second heat recovery operation.

MODIFICATION EXAMPLE 14

The device configuration of a hydrogen generator 1014 of Modification Example 14 is different from that of the hydrogen generator of Modification Example 13 in that the radiator 146 is not disposed on the third bypass passage 145 but is disposed on a second branching passage 147 which does not bypass the heat accumulator 140 and branches from the second heat medium passage 143 and joins the second heat medium passage 143. The other components of the hydrogen generator 1014 of Modification Example 14 are the same as those of the hydrogen generator 1012 of Modification Example 13.

Figure 12:
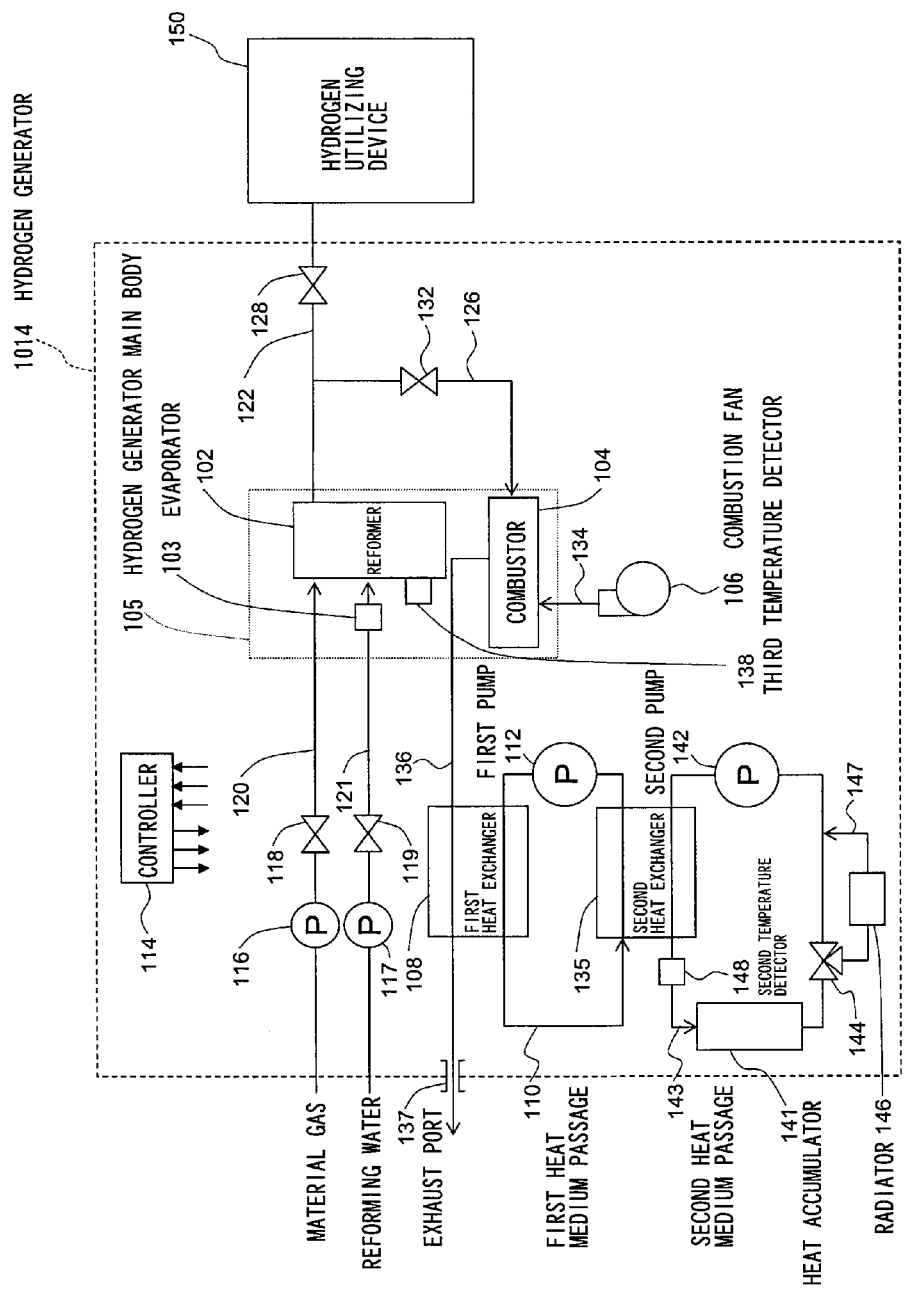
FIG. 12 is a block diagram showing one example of a schematic configuration of the hydrogen generator according to Modification Example 14 of Embodiment 1 of the present invention.

FIG. 12 is a block diagram showing one example of a schematic configuration of the hydrogen generator 1014 of Modification Example 14 of Embodiment 1 of the present invention. In FIG. 12, the same reference signs and names are used for the same components as in FIG. 7, and detailed explanations thereof are omitted.

The radiator 146 is disposed on the second branching passage 147 and executes the active cooling operation.

The second branching passage 147 is a passage branching from the second heat medium passage 143. In the present modification example, the second branching passage 147 does not bypass the heat accumulator 140 and branches from the second heat medium passage 143 and joins the second heat medium passage 143.

In the present modification example, the controller 114 switches the switching device such that the switching device causes the second heat medium to flow in the radiator 146 in the cooling step, and the controller 114 causes the second pump 142 to operate. With this, the second heat medium is efficiently cooled down by the radiator 146, and the exhaust air is also efficiently cooled down.

In the present modification example, it is preferable to cause the first pump 112 to operate when causing the second pump 142 to operate. The position of the radiator disposed on the second heat medium passage is not limited to Modification Examples 13 and 14. The radiator may be disposed on anywhere as long as it is disposed on the second branching passage branching from the second heat medium passage.

Embodiment 2

Figure 13:
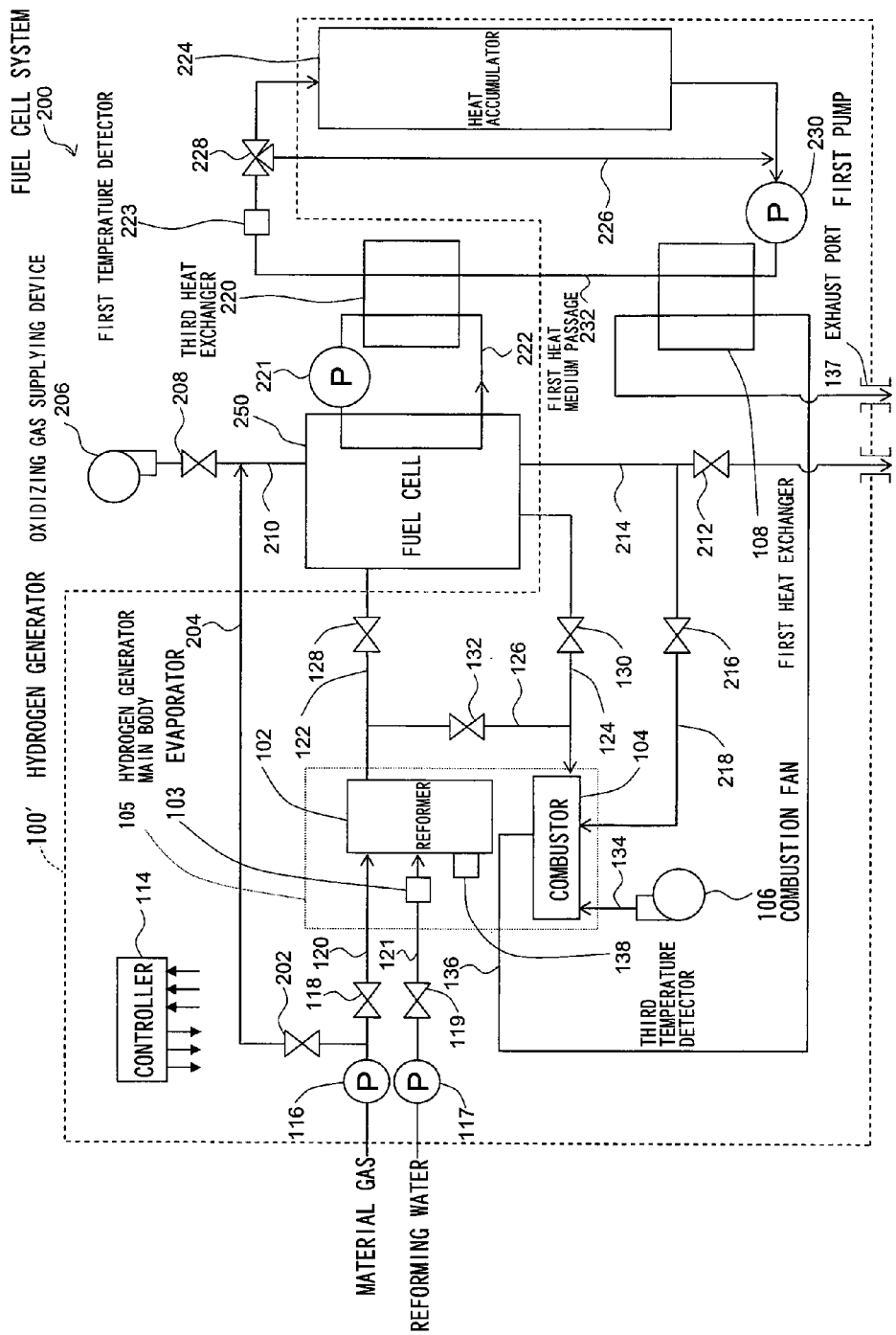
FIG. 13 is a block diagram showing one example of a schematic configuration of each of the hydrogen generator and the fuel cell system of Embodiment 2 of the present invention.

FIG. 13 is a block diagram showing one example of a schematic configuration of each of the hydrogen generator and the fuel cell system of Embodiment 2 of the present invention.

The fuel cell system 200 of the present embodiment is the same in configuration as the hydrogen generator 100 of Embodiment 1 except that: a heat medium passage through which the heat medium receiving the heat recovered from the flue gas in the first heat exchanger 108 flows is a first heat medium passage 232; and a pump configured to cause the heat medium in the heat medium passage to flow is a first pump 230.

In accordance with this configuration, the controller 114 causes the first pump 230 to operate in the cooling step that is a step of cooling down the reformer 102 by the air supplied from the air supplying device in a state where the combustion in the combustor 104 does not occur when the fuel cell system stops the electric power generating operation. With this, as compared to conventional fuel cell systems, the possibility that the heat deterioration of the exhaust gas heat exchanger may occur and the possibility that the person near the exhaust port may get burned can be reduced.

Or, the fuel cell system 200 of the present embodiment may include: a heat accumulator 224 configured to store the heat medium having passed through the first heat exchanger 108; a bypass passage 226 formed to cause a heat medium exhaust port of the first heat exchanger 108 and a heat medium inlet port of the first heat exchanger 108 to be communicated with each other without passing through the heat accumulator 224; a switching device (for example, a three-way valve 228) configured to switch a destination to which the heat medium having passed through the first heat exchanger 108 is supplied, between the heat accumulator 224 and the fifth bypass passage 226; and a heat medium temperature detector (for example, a first temperature detector 223) configured to detect the temperature of the heat medium which has been discharged from the first heat exchanger 108 and will flow into the heat accumulator 224. In addition, the controller 114 may be configured to control the switching device such that the destination to which the heat medium having been discharged from the first heat exchanger 108 is supplied is set to the heat accumulator 224 when the temperature detected by the heat medium temperature detector is equal to or higher than the first threshold. Moreover, the controller 114 may be configured to control the switching device such that the destination to which the heat medium having been discharged from the first heat exchanger 108 is supplied is set to the fifth bypass passage 226 when the temperature detected by the heat medium temperature detector is lower than the first threshold. With this, the low-temperature first heat medium having recovered the exhaust heat from the exhaust air in the cooling step can be prevented from flowing into the heat accumulator. Thus, the temperature of the inside of the heat accumulator can be prevented from decreasing.

Or, in the fuel cell system 200 of the present embodiment, the fuel cell 250 may include the cathode (not shown), the cathode purging operation of supplying the raw material (for example, the material gas) to the cathode and combusting in the combustor 104 the raw material having passed through the cathode may be carried out, and the controller 114 may carry out the cooling step and the heat recovery operation after the cathode purging operation is terminated. In the cathode purging operation, the combustion is carried out in the combustor using the gas having passed through the cathode. Therefore, the heat including the heat applied at the time of cathode purging is quickly recovered. Thus, the reformer can be cooled down.

Details of Device Configuration

A hydrogen generator 100' in the fuel cell system 200 of the present embodiment is the same as the hydrogen generator 100 of Embodiment 1 except that: the hydrogen utilizing device 150 is replaced with the fuel cell 250; a fourth bypass passage 204 which does not pass through the reformer 102 and connects the material gas supplying passage 120 and the fuel cell 250 is formed; an oxidizing gas discharging passage 214 and a cathode purge gas discharging passage 218 which connect the fuel cell 250 and the combustor 104 are formed; and the first pump 112 is replaced with the first pump 230. The same reference signs and names are used for the other components, that is, the components common between the hydrogen generator 100' and the hydrogen generator 100, and explanations thereof are omitted.

The fuel cell 250 generates the electric power such that: the hydrogen-containing gas (fuel gas) supplied from the hydrogen generator 100' is caused to flow through an anode gas channel inside the fuel cell 250; and the oxidizing gas (for example, air) supplied from an oxidizing gas supplying device 206 (for example, a blower) through an oxidizing gas supplying passage 210 is caused to flow through a cathode gas channel inside the fuel cell 250. An entrance of the anode gas channel inside the fuel cell 250 is connected to the fuel gas supplying passage 122, and an exit thereof is connected to a fuel off gas passage 124. The fuel off gas passage 124 is connected to the first bypass passage 126. A fourth on-off valve 130 is disposed on the fuel off gas passage 124. An entrance of the cathode gas channel inside the fuel cell 250 is connected to the oxidizing gas supplying passage 210, and an exit thereof is connected to the oxidizing gas discharging passage 214.

The fourth bypass passage 204 is a passage which branches from the material gas supplying passage 120 and bypasses the hydrogen generator main body 105 to supply the raw material to the cathode channel of the fuel cell 250. Specifically, the fourth bypass passage 204 is a passage which branches from the material gas supplying passage 120 and connects a portion of the material gas supplying passage 120 and the oxidizing gas supplying passage 210, the portion extending between the booster pump 116 and the first on-off valve 118. A sixth on-off valve 202 is disposed on the fourth bypass passage 204.

A seventh on-off valve 208 is disposed on the oxidizing gas supplying passage 210 extending between an exit of the oxidizing gas supplying device 206 and a joining portion where the fourth bypass passage 204 and the oxidizing gas supplying passage 210 join.

An eighth on-off valve 212 is disposed on the oxidizing gas discharging passage 214. The cathode purge gas discharging passage 218 is a passage through which the gas discharged from the cathode gas channel of the fuel cell 250 is introduced to the combustor 104 in the cathode purging operation. Specifically, the cathode purge gas discharging passage 218 branches from the oxidizing gas discharging passage 214 located upstream of the eighth on-off valve 212 and is connected to the combustor 104. A ninth on-off valve 216 is disposed on the cathode purge gas discharging passage 218.

A cooling water passage 222 extends through the inside of the fuel cell 250 and the inside of a third heat exchanger 220. The cooling water flows through the inside of the cooling water passage 222. A cooling water pump 221 is disposed on the cooling water passage 222. The cooling water pump 221 causes the cooling water to circulate in the cooling water passage 222.

The first heat medium passage 232 connects the heat accumulator 224 and the first heat exchanger 108, extends through the inside of the first heat exchanger 108, connects the first heat exchanger 108 and the third heat exchanger 220, extends through the inside of the third heat exchanger 220, and connects the third heat exchanger 220 and the heat accumulator 224. Water as the heat medium flows through the inside of the first heat medium passage 232.

The first pump 230 is disposed on the first heat medium passage 232. The first pump 230 causes the heat medium to circulate in the first heat medium passage 232.

The first temperature detector 223 and the three-way valve 228 are provided downstream of the first heat exchanger 108, that is, the first temperature detector 223 and the three-way valve 228 are disposed on the first heat medium passage 232 connecting an exit of the first heat exchanger 108 and an entrance of the heat accumulator 224 (the first temperature detector 223 and the three-way valve 228 are provided downstream of the third heat exchanger 220, that is, the first temperature detector 223 and the three-way valve 228 are disposed on the first heat medium passage 232 connecting an exit of the third heat exchanger 220 and the entrance of the heat accumulator 224). The fifth bypass passage 226 is a passage which bypasses the heat accumulator 224 and causes the heat medium to circulate in the first heat medium passage 232 including the first heat exchanger 108 and the third heat exchanger 220. Specifically, the fifth bypass passage 226 is formed as a passage which connects the first heat medium passage 232 located upstream of the first heat exchanger 108 and the first heat medium passage 232 located downstream of the third heat exchanger 220. The three-way valve 228 is one example of a "switching device". Instead of the three-way valve 228, on-off valves may be respectively disposed on the first heat medium passage 232 and the fifth bypass passage 226 and may serve as the switching device by switching on-off operations.

The first temperature detector 223 detects the temperature of the heat medium in the first heat medium passage 232 and transmits the result to the controller 114.

The controller 114 includes a CPU, a memory, and the like. The controller 114 is electrically connected to the on-off valves 118, 119, 128, 130, 132, 202, 208, 212, and 216, the combustion fan 106, the booster pump 116, the oxidizing gas supplying device 206, the cooling water pump 221, the first pump 230, the three-way valve 228, and the like and controls these. To be specific, in the present embodiment, the controller 114 serves as not only a controller of the hydrogen generator 100' but also a controller of the fuel cell system 200. However, separate controllers may be respectively provided in the hydrogen generator 100' and the fuel cell system 200. Needless to say, the number of controllers is not limited.

Operation: Electric Power Generating Operation

Hereinafter, the electric power generating operation of the fuel cell system 200 will be schematically explained. The following operations are executed such that the controller 114 controls respective portions of the hydrogen generator 100' and respective portions of the fuel cell system 200.

In the electric power generating operation, the hydrogen generator 100' carries out the hydrogen generating operation. Since details of the hydrogen generating operation are the same as those in Embodiment 1, explanations thereof are omitted.

In the electric power generating operation, a cathode purge passage is blocked by the closure of each of the sixth on-off valve 202 and the ninth on-off valve 216, and an oxidizing gas passage is open by the opening of each of the seventh on-off valve 208 and the eighth on-off valve 212. The hydrogen-containing gas (fuel gas) is supplied from the hydrogen generator main body 105 to the anode of the fuel cell 250, and the oxidizing gas (for example, air) is supplied from the oxidizing gas supplying device 206 to the cathode of the fuel cell 250. Thus, the fuel cell 250 generates the electric power.

The hydrogen-containing gas (fuel off gas) discharged from the anode of the fuel cell 250 is supplied to the combustor 104 through the fuel off gas passage 124 to be combusted in the combustor 104.

Moreover, in the electric power generating operation, the cooling water pump 221 is activated, and the heat inside the fuel cell 250 is transferred through the third heat exchanger 220 to the heat medium in the first heat medium passage 232. The first temperature detector 223 detects the temperature of the heat medium. In a case where the temperature of the heat medium is equal to or higher than the first threshold, the state where the three-way valve 228 causes the heat medium to flow in the heat accumulator 224 is maintained, so that the destination to which the heat medium discharged from the first heat exchanger 108 (and the third heat exchanger 220) is supplied is the heat accumulator 224. With this control, the temperature inside the fuel cell 250 is preferably maintained for the electric power generating reaction, and the heat generated by the electric power generating reaction is effectively accumulated in the heat accumulator 224.

In contrast, while the temperature detected by the first temperature detector 223 is lower than the first threshold, the state where the three-way valve 228 causes the heat medium to flow in the fifth bypass passage 226 is maintained, so that the destination to which the heat medium discharged from the first heat exchanger 108 (and the third heat exchanger 220) is supplied becomes the fifth bypass passage 226. Here, the "first threshold" is controlled as the lower storage temperature limit (lower hot water temperature limit in a case where the heat accumulator is the hot water tank) set for, for example, preventing the temperature of the heat medium supplied to the heat accumulator from excessively decreasing. With this control, the low-temperature heat medium can be prevented from flowing into the heat accumulator 224. Thus, the internal temperature of the heat accumulator 224 can be prevented from decreasing.

Operation: Stop Processing

Figure 14:
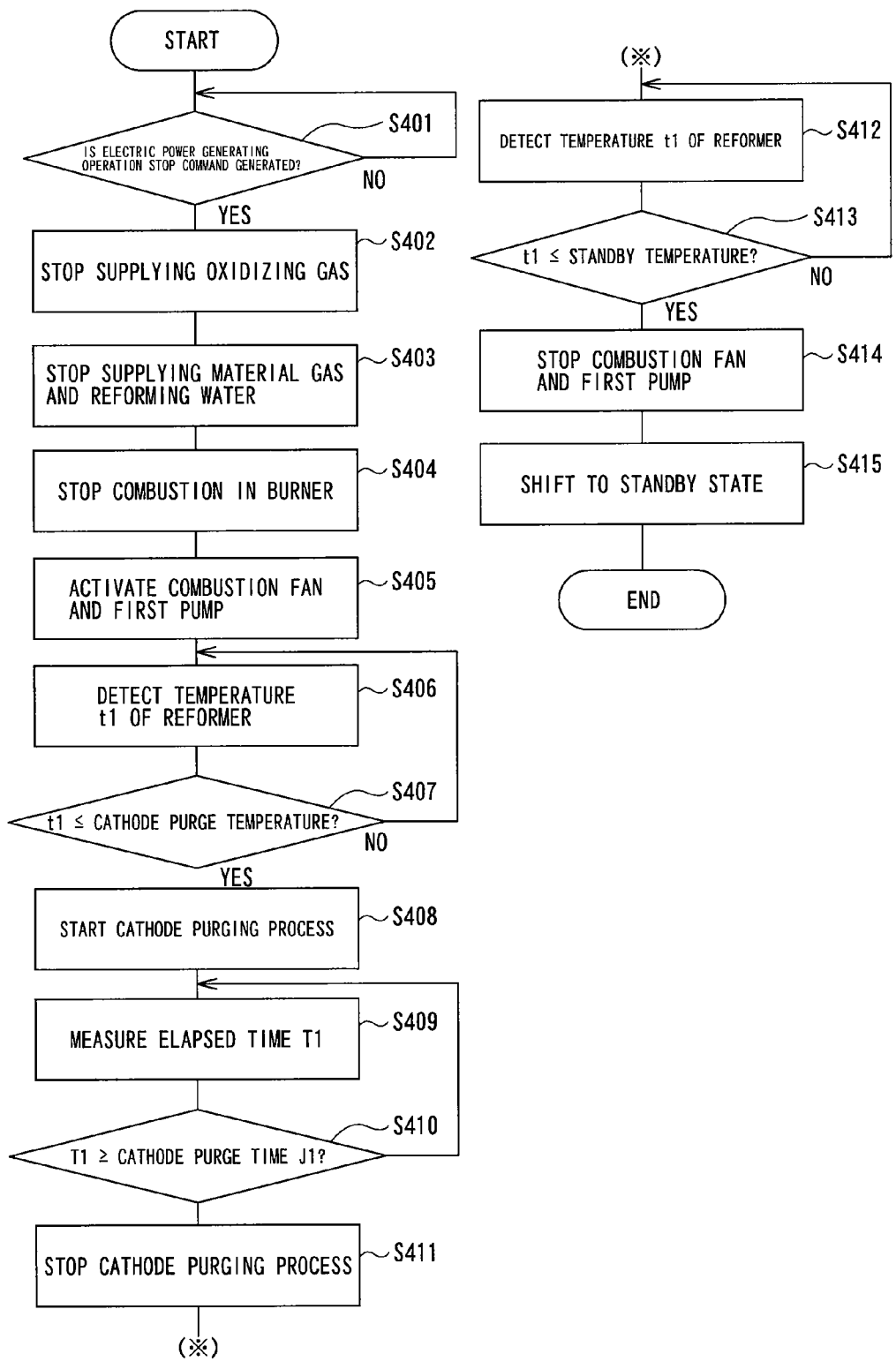
FIG. 14 is a flow chart schematically showing operations carried out when the hydrogen generator and the fuel cell system of Embodiment 2 of the present invention stop electric power generating operation.

FIG. 14 is a flow chart schematically showing operations carried out when the fuel cell system of the present embodiment stops the electric power generating operation. Hereinafter, the operations of the stop processing of the hydrogen generator 100' and the fuel cell system 200 of the present embodiment will be schematically explained in reference to FIG. 14.

Whether or not an electric power generating operation stop command is generated is determined (Step S401) in the electric power generating operation of the fuel cell system 200. In a case where the electric power generating operation stop command is generated, the controller 114 stops the oxidizing gas supplying device 206 and closes the seventh on-off valve 208 to stop the supply of the oxidizing gas (Step S402). In addition, the controller 114 stops the operation of each of the booster pump 116 and the reforming water pump 117 and closes the first on-off valve 118 and the second on-off valve 119 to stop the supply of each of the material gas and the reforming water (Step S403).

Next, the fourth on-off valve 130 and the fifth on-off valve 132 are closed. Thus, the combustion in the combustor 104 (burner) stops (Step S404). In the combustion stop of the combustor in Step S103, an operation of discharging the combustible gas remaining in the combustor 104 to outside the casing by supplying the air from the combustion fan 106 is normally executed after the flame is extinguished in the combustor. Thus, the combustion stop processing of the combustor 104 is terminated. Next, in a state where the combustion in the combustor 104 does not occur, the combustion fan 106 and the first pump 230 are activated. Thus, the reformer 102 is cooled down by the air supplied from the combustion fan 106, and the potential heat of the exhaust air having cooled down the reformer 102 is recovered by the first heat medium (Step S405).

Next, the temperature t1 of the reformer 102 is detected by the third temperature detector 138 (Step S406), and whether or not the temperature t1 is equal to or lower than a cathode purge temperature is determined (Step S407). The cathode purge temperature is, for example, about 600° C.

In a case where the result of the determination in Step S407 is NO, the process returns to Step S406. In a case where the result of the determination in Step S407 is YES, a cathode purging process starts (Step S408). Here, in a state where the seventh on-off valve 208 and the eighth on-off valve 212 are closed, the sixth on-off valve 202 and the ninth on-off valve 216 open. Then, the raw material supplying device (the booster pump 116) is activated. Thus, the material gas supplied from the booster pump 116 is supplied to the cathode of the fuel cell 250 without passing through the reformer 102. A cathode passage (gas channel) of the fuel cell 250 is purged by the material gas. The material gas discharged from an exit of the cathode passage is supplied to the combustor 104 and combusted in the combustor 104. These operations are included in the cathode purging process. In the present embodiment, the operation of each of the combustion fan 106 and the first pump 230 is executed in the cathode purging process.

Moreover, in the present embodiment, the first on-off valve 118 and the second on-off valve 119 also open in the cathode purging process. Thus, the material gas and the reforming water are also supplied to the reformer 102. At this time, in a state where the third on-off valve 128 and the fourth on-off valve 130 are closed, the fifth on-off valve 132 opens. Thus, the hydrogen-containing gas generated in the reformer 102 and the unreacted material gas are supplied to the combustor 104 through the first bypass passage 126 and combusted in the combustor 104 together with the material gas discharged from the cathode.

In a case where an oxidizing agent remains in the cathode passage during the operation stop, the hydrogen flows from the anode to the cathode passage and reacts with the oxidizing agent, and this causes problems, such as the deterioration of the polymer electrolyte membrane. In the present embodiment, such problem is reduced by removing the oxidizing agent from the cathode passage by the cathode purging process.

When the cathode purging process starts, an elapsed time T1 is measured (Step S409). Then, whether or not the elapsed time T1 is equal to or longer than a predetermined cathode purge time J1 is determined (Step S410). In a case where the result of the determination is NO, the process returns to Step S409. In a case where the result of the determination is YES, the cathode purging process stops (Step S411). The temperature of the reformer 102 when the cathode purging process has stopped is, for example, about 630° C. When the cathode purging process stops, the combustion in the combustor 104 stops. Then, in a state where the combustion in the combustor 104 does not occur, the operation of each of the combustion fan 106 and the first pump 230 is executed (cooling step). With this, after the exhaust air having cooled down the reformer 102 is cooled down in the first heat exchanger 108, it is discharged to outside the casing of the fuel cell system 200 from the exhaust port 137 of the flue gas.

Next, the temperature t1 of the reformer is again detected by the third temperature detector 138 (Step S412), and whether or not the temperature t1 is equal to or lower than the standby temperature (for example, 500° C.) is determined (Step S413).

In a case where the result of the determination in Step S413 is YES, the operation of each of the combustion fan 106 and the first pump 230 stops (Step S414). Then, the hydrogen generator 100' and the fuel cell system 200 shift to the standby state (Step S415). Thus, the stop processing is terminated (END). To be specific, the operation of the first pump 230 stops in accordance with the stop of the supply of the air from the combustion fan 106.

In a case where the result of the determination in Step S413 is NO, the process returns to Step S412.

Here, the "standby temperature" is defined as a temperature at which the fuel cell system 200 can terminate the stop processing and shift to the standby state (standby state where the start-up processing is started immediately if the start-up request is generated) for the next start-up. A specific value of the standby temperature is the same as the "standby temperature" explained in the stop processing of the hydrogen generator of Embodiment 1.

Moreover, the "cathode purge time" is defined as, for example, a time set such that the oxidizing gas in the cathode passage of the fuel cell 250 is completely replaced with the material gas.

Figure 15:
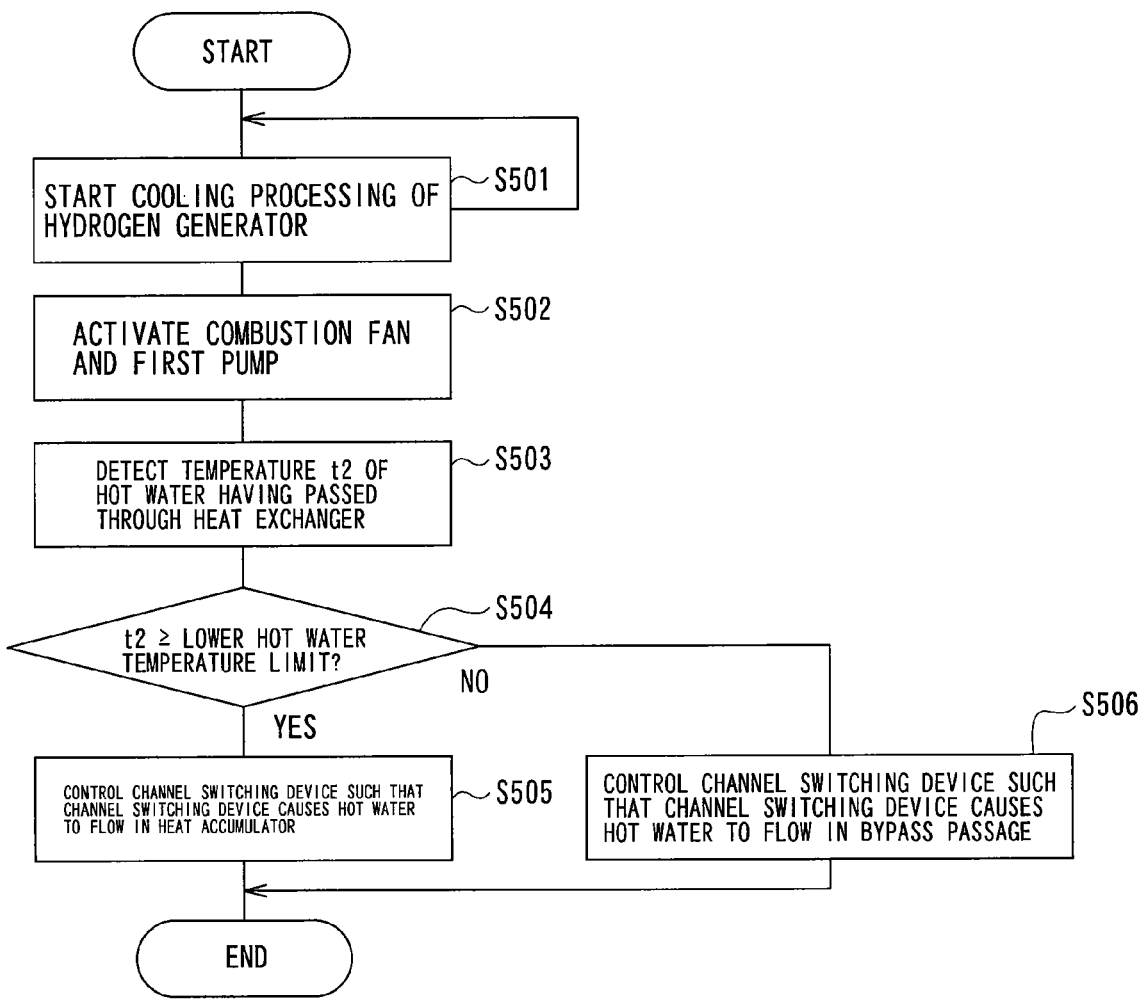
FIG. 15 is a flow chart schematically showing a passage switching operation carried out when the hydrogen generator and the fuel cell system of Embodiment 2 of the present invention stop the electric power generating operation.

FIG. 15 is a flow chart schematically showing a passage switching operation carried out when the fuel cell system of the present embodiment stops the electric power generating operation. Hereinafter, the passage switching operation in the heat recovery operation in the cooling step of the reformer when the fuel cell system 200 of the present embodiment stops the electric power generating operation will be schematically explained in reference to FIG. 15. The following operation (the determination and the passage switching operation corresponding to the result of the determination) is carried out periodically (for example, every three seconds) during the stop processing.

When the stop processing starts (START), a cooling processing of the hydrogen generator starts (Step S501). Here, in a state where the combustion in the combustor 104 does not occur, the combustion fan 106 and the first pump 230 are activated. Thus, the reformer 102 and the gas discharged from the combustor 104 are cooled down by the air supplied from the combustion fan 106 (Step S502).

Next, a temperature t2 of the hot water (water in the first heat medium passage 232) having flowed through the first heat exchanger 108 is detected by the first temperature detector 223 (Step S503), and whether or not the temperature t2 is equal to or lower than the lower hot water temperature limit is determined (Step S504).

In a case where the result of the determination in Step S504 is YES, the temperature inside the heat accumulator 224 does not excessively decrease even if the water in the first heat medium passage 232 is directly supplied to the heat accumulator 224. Therefore, the three-way valve 228 (channel switching device) is controlled to be connected to the heat accumulator (Step S505). Thus, the passage switching operation is terminated (END). With this, the water having flowed through the three-way valve 228 is supplied to the heat accumulator 224.

In a case where the result of the determination in Step S504 is NO, the temperature inside the heat accumulator 224 may decrease to a reference temperature or lower if the water in the first heat medium passage 232 is directly supplied to the heat accumulator 224. Here, the three-way valve 228 (channel switching device) is controlled such that the three-way valve 228 causes the heat medium to flow in the fifth bypass passage 226 (Step S505). Thus, the passage switching operation is terminated (END). With this, the water having flowed through the three-way valve 228 is not supplied to the heat accumulator 224 but is supplied to the first pump 230 through the fifth bypass passage 226.

In the cooling step of the reformer, the operation of each of the combustion fan 106 and the first pump 112 may be carried out continuously or intermittently.

Moreover, the foregoing has explained the cathode purging process shown in FIG. 14 and the passage switching in the heat recovery operation shown in FIG. 15. However, the stop processing of the fuel cell system may not include at least one of the cathode purging process and the passage switching in the heat recovery operation. Moreover, Modification Examples (Modification Example 1, Modification Example 2, Modification Example 3, Modification Example 5, Modification Example 7, Modification Example 8, Modification Example 11, Modification Example 12, and the like) related to a primary cooling system explained in Embodiment 1 can be applied to the present embodiment, and the same effects as respective modification examples can be obtained.

MODIFICATION EXAMPLE 1

The fuel cell system of Modification Example 1 is different from the fuel cell system 200 in that a secondary cooling system is included, and the heat accumulator is provided in the secondary cooling system.

Figure 16:
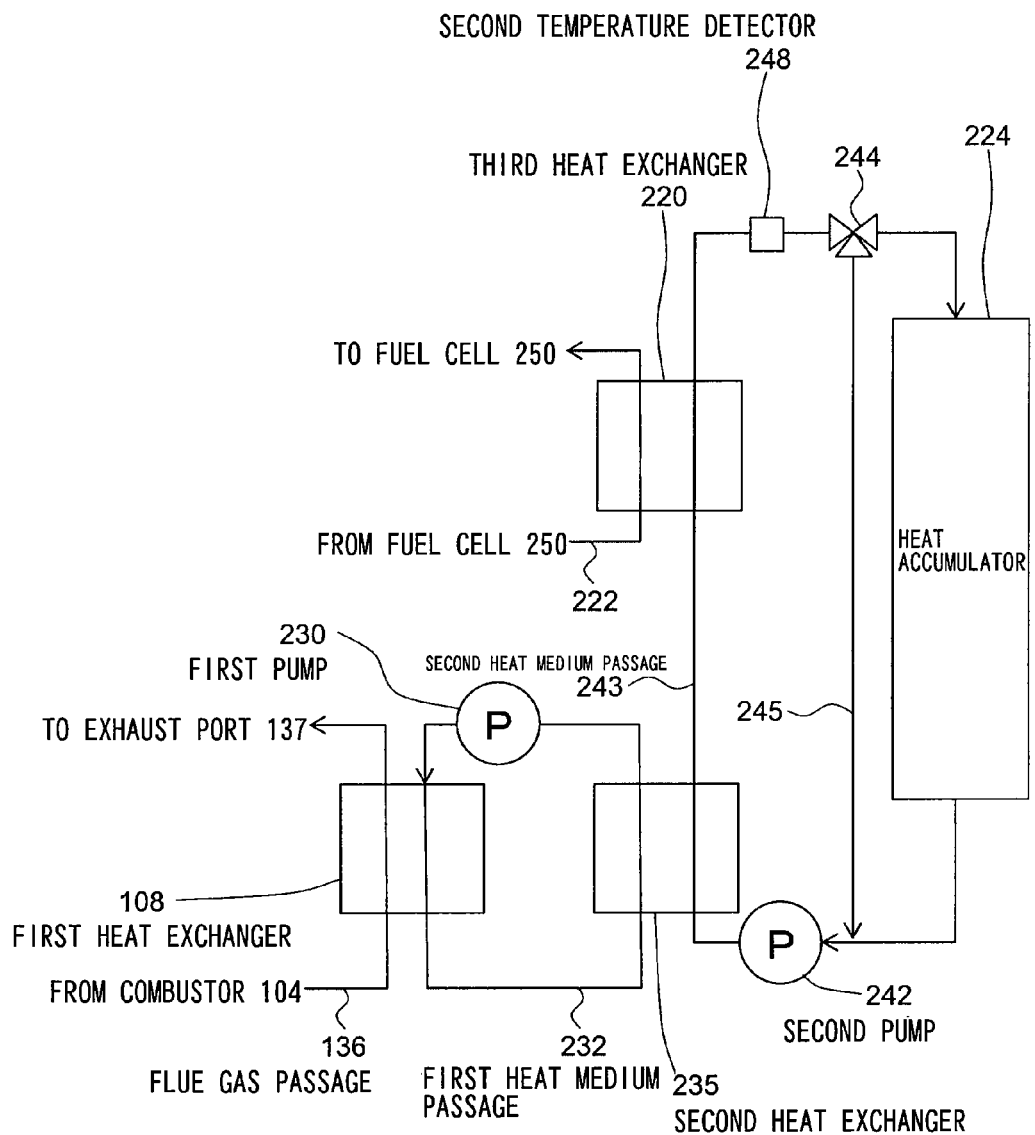
FIG. 16 is a block diagram showing a schematic configuration of portions of the fuel cell system according to Modification Example 1 of Embodiment 2 of the present invention, the portions being different from those in FIG. 13.

FIG. 16 is a block diagram showing a schematic configuration of portions of the fuel cell system of the present modification example, the portions being different from those in FIG. 13. The fuel cell system of Modification Example 1 is the same as the fuel cell system of Embodiment 2 shown in FIG. 13 except that: the primary cooling system through which the first heat medium flows in FIG. 13 serves as the secondary cooling system; and the primary cooling system is additionally provided therebetween. Therefore, in FIG. 16, the same components as in FIG. 13 are omitted, and the same reference signs and names are used for the same components and detailed explanations thereof are omitted.

A second heat exchanger 235 is a heat exchanger configured to recover the heat from the first heat medium in the first heat medium passage 232. A second heat medium passage 243 is a passage through which the second heat medium flows, the second heat medium receiving the heat recovered from the first heat medium in the second heat exchanger 235. A second pump 242 is a pump configured to cause the second heat medium in the second heat medium passage 243 to flow.

As shown in FIG. 16, in the present modification example, the second heat medium exchanges the heat with the first heat medium in the second heat exchanger 235 and also exchanges the heat in the third heat exchanger 220 with the cooling water flowing through the fuel cell 250.

The operation of the fuel cell system of the present modification example is such that in the explanation of the fuel cell system 200 of Embodiment 2, the first temperature detector 228 is replaced with a second temperature detector 248, the first pump 230 is replaced with the second pump 242, the three-way valve 228 is replaced with a three-way valve 244, the fifth bypass passage 226 is replaced with a sixth bypass passage 245, and the first pump 230 is activated at the same time as the operation of the second pump 242. Therefore, a detailed explanation thereof is omitted. In the present modification example, the heat accumulator 224 stores not the first heat medium but the second heat medium.

Further, Modification Examples (Modification Example 4, Modification Example 6, Modification Example 9, Modification Example 10, Modification Example 13, Modification Example 14, and the like) related to the secondary cooling system explained in Embodiment 1 can be applied to the present modification example, and the same effects as in respective modification examples can be obtained.

MODIFICATION EXAMPLE 2

The fuel cell system of Modification Example 2 is different from the fuel cell system 200 in that the cooling system includes a radiator.

Figure 17:
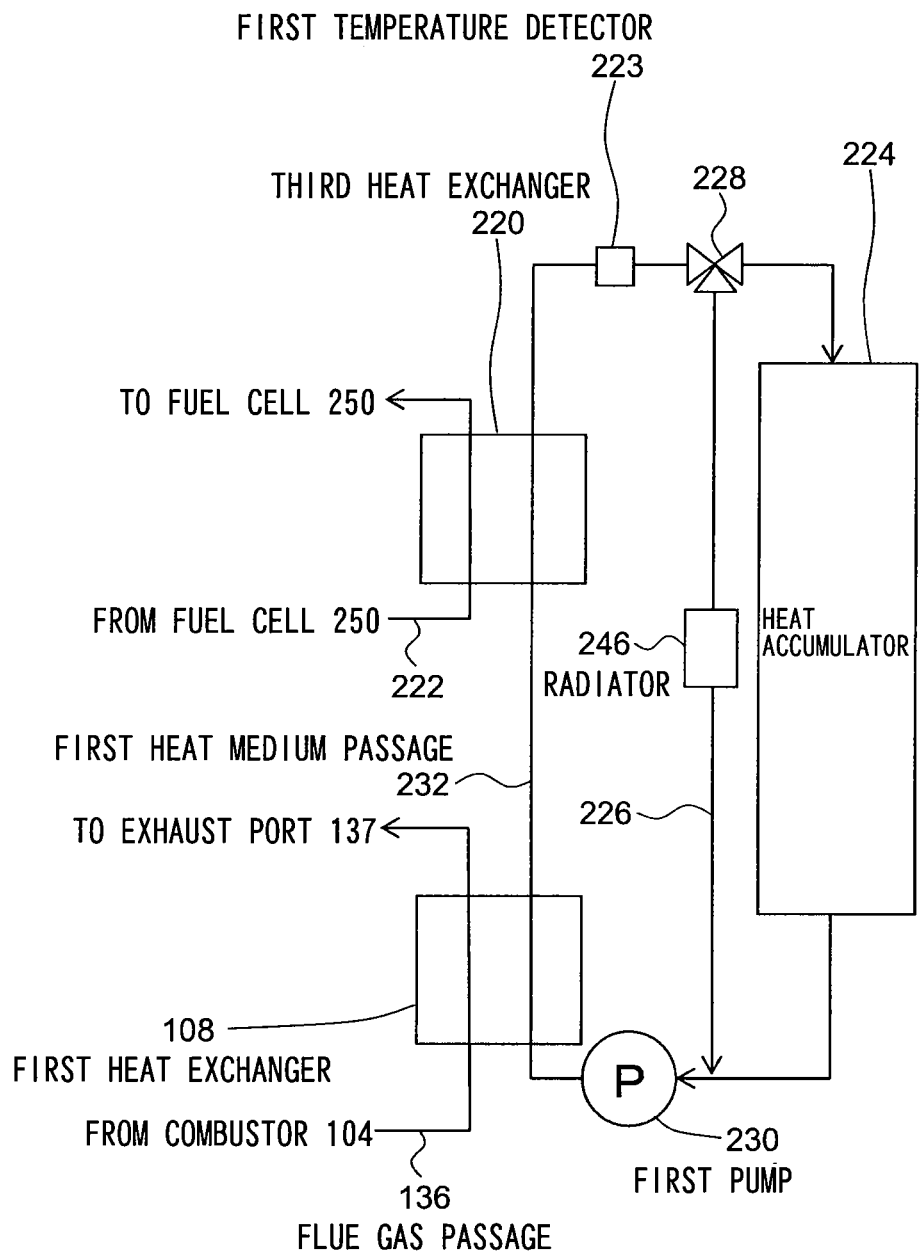
FIG. 17 is a block diagram showing a schematic configuration of portions of the fuel cell system according to Modification Example 2 of Embodiment 2 of the present invention, the portions being different from those in FIG. 13.

FIG. 17 is a block diagram showing a schematic configuration of portions of the fuel cell system of Modification Example 2, the portions being different from those in FIG. 13. The fuel cell system of Modification Example 2 is the same as the fuel cell system shown in FIG. 13 except that a radiator 246 is disposed on the fifth bypass passage 226 which bypasses the heat accumulator 224 and through which the first heat medium flows. Therefore, in FIG. 17, the same components as in FIG. 13 are omitted, and the same reference signs and names are used for the same components, and detailed explanations thereof are omitted. The radiator 246 is disposed on the fifth bypass passage 226 and configured to execute the active cooling operation.

Since the operations carried out when the fuel cell system of Modification Example 2 shown in FIG. 17 stops generating the electric power may be the same as those of the fuel cell system 200 of Embodiment 2, detailed explanations thereof are omitted.

The present modification example is obtained by applying Modification Example 11 of Embodiment 1 to the fuel cell system of Embodiment 2.

Each of the above embodiments and modification examples has explained the fuel cell system in which the reformer and the fuel cell are separately provided. However, the fuel cell system may be configured such that the reformer and the fuel cell are integrally formed. Examples of such fuel cell system are an indirect internal reforming type solid oxide fuel cell separately including the reformer portion configured to carry out the reforming reaction and the fuel cell portion and an internal reforming type solid oxide fuel cell configured to carry out the reforming reaction in the fuel cell main body. In the case of the indirect internal reforming type solid oxide fuel cell, the reformer portion and the fuel cell portion are heated by the flue gas, and the flue gas used for the above heating and the first heat medium can exchange the heat with each other in the first heat exchanger. In the case of the internal reforming type solid oxide fuel cell, the fuel cell portion which carries out both the reforming reaction and the cell reaction is heated by the flue gas, and the flue gas used for the above heating and the first heat medium can exchange the heat with each other in the first heat exchanger. The fuel cell system of the present invention includes these types.

Moreover, in the heat recovery operation in the above embodiments and modification examples, the heat medium (the first heat medium, the second heat medium) which recovers the heat from the exhaust air having cooled down the reformer is caused to circulate. With this, the possibility that the heat deterioration of the exhaust gas heat exchanger may occur and the possibility that the person near the exhaust port may get burned are reduced as compared to conventional hydrogen generators and fuel cell systems.

However, in order to further reduce the above possibilities, the manipulated variable of the first pump may be controlled such that in the cooling step of the reformer, the temperature of the exhaust air discharged from the first heat exchanger is maintained to be equal to or lower than an upper temperature limit at which the possibility that the person may get burned is low. In this case, for example, a lower manipulated variable limit of the first pump is set, which is necessary to realize that the temperature of the exhaust air discharged from the exhaust port becomes equal to or lower than the above upper temperature limit in the cooling step of the reformer, and the manipulated variable of the first pump is controlled so as not to fall below the above lower manipulated variable limit in the heat recovery operation using the first heat medium. More specifically, in a case where the manipulated variable of the first pump controlled based on the temperature detected by the first temperature detector falls below the lower manipulated variable limit in the first heat recovery operation, the lower manipulated variable limit has a priority, and the manipulated variable of the first pump is controlled to be equal to or larger than the lower manipulated variable limit. Moreover, in the second heat recovery operation, the manipulated variable of the first pump is controlled to become a predetermined value which exceeds the lower manipulated variable limit. The lower manipulated variable limit may be changed in accordance with the temperature of the exhaust air flowing into the first heat exchanger in the cooling step (or in accordance with the temperature of the reformer related to the temperature of the exhaust air, the duration time of the cooling step, or the like). Moreover, a fixed value may be used as the lower manipulated variable limit necessary to realize that the temperature of the exhaust air discharged from the exhaust port becomes equal to or lower than the upper temperature limit in a case where the temperature of the exhaust air is the highest. Moreover, in the case of executing the heat recovery operation in the secondary cooling system, the lower manipulated variable limit may be set for each of the first pump and the second pump.

Moreover, in order to further reduce the possibility that the heat deterioration of the exhaust gas heat exchanger may occur, the manipulated variable of the first pump may be controlled such that the temperature of each of peripheral components of the first heat exchanger is maintained to be equal to or lower than the upper temperature limit of each of the peripheral components in the cooling step of the reformer. In this case, for example, the lower manipulated variable limit of the first pump is set, which is necessary to realize that the temperature of the peripheral portion of the first heat exchanger becomes equal to or lower than the upper temperature limit in the cooling step of the reformer, and the manipulated variable of the first pump is controlled so as not to fall below the lower manipulated variable limit in the heat recovery operation using the first heat medium. Since the specific example of controlling the manipulated variable of the first pump is the same as the case of the temperature of the exhaust air discharged from the exhaust port, an explanation thereof is omitted. Moreover, the manipulated variable of the first pump (second pump) may be controlled in consideration of both the lower manipulated variable limit set in consideration of the temperature of the exhaust air discharged from the exhaust port and the lower manipulated variable limit set in consideration of the heat deterioration of the peripheral portion of the first heat exchanger.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

Industrial Applicability

The hydrogen generator and the fuel cell system according to the present invention are useful as a hydrogen generator configured such that the possibility that the heat deterioration of the exhaust gas heat exchanger may occur in the cooling step of the stop processing and the possibility that the person near the exhaust port may get burned in the cooling step of the stop processing are reduced than before, and a fuel cell system including the hydrogen generator.

REFERENCE SIGNS LIST 100, 100' hydrogen generator
102 reformer
104 combustor
106 combustion fan
108 first heat exchanger
110 first heat medium passage
112 first pump
114 controller
116 booster pump
118 first on-off valve
119 second on-off valve
120 material gas supplying passage
121 reforming water supplying passage
122 fuel gas supplying passage
123 first temperature detector
124 fuel off gas passage
126 first bypass passage
127 second bypass passage
128 third on-off valve
129 three-way valve
130 fourth on-off valve
131 radiator
132 fifth on-off valve
133 first branching passage
134 combustion air supplying passage
135 second heat exchanger
136 flue gas passage
138 third temperature detector
140 heat accumulator
141 heat accumulator
142 second pump
143 second heat medium passage
144 three-way valve
145 third bypass passage
146 radiator
147 second branching passage
148 second temperature detector
150 hydrogen utilizing device
200 fuel cell system
202 sixth on-off valve
204 fourth bypass passage
206 oxidizing gas supplying device
208 seventh on-off valve
210 oxidizing gas supplying passage
212 eighth on-off valve
214 oxidizing gas discharging passage
216 ninth on-off valve
218 cathode purge gas discharging passage
220 third heat exchanger
221 cooling water pump
222 cooling water passage
223 first temperature detector
224 heat accumulator
226 fifth bypass passage
228 three-way valve
230 first pump
232 first heat medium passage
235 second heat exchanger
242 second pump
243 second heat medium passage
244 three-way valve
245 sixth bypass passage
246 radiator
248 second temperature detector
249 heat accumulator
250 fuel cell

The invention claimed is:

1. A hydrogen generator comprising:
a reformer configured to generate a hydrogen-containing gas by a reforming reaction using a raw material;
a combustor configured to heat the reformer;
an air supplying device configured to supply combustion air to the combustor;
a first heat exchanger configured to recover heat from a flue gas discharged from the combustor;
a first heat medium passage through which a first liquid heat medium flows, the first liquid heat medium receiving the heat recovered from the flue gas in the first heat exchanger;
a first pump configured to cause the first liquid heat medium in the first heat medium passage to flow;
a heat accumulator configured to store the heat recovered by the first liquid heat medium; and
a controller including a computer and a memory storing a program,
wherein the program, when executed by the computer, causes the controller to cause the first pump to cause the first liquid heat medium to flow in a cooling step of cooling down at least the reformer by the air supplied from the air supplying device in a state where the combustor is not carrying out combustion when the hydrogen generator stops.

2. The hydrogen generator according to claim 1, further comprising a raw material supplying device configured to supply the raw material to the reformer, wherein:
the raw material is supplied from the raw material supplying device to the reformer when the hydrogen generator starts up, and the raw material having passed through the reformer is combusted in the combustor to heat the reformer; and
the program, when executed by the computer, further causes the controller to continue the cooling step until at least a temperature of the reformer becomes equal to or lower than a standby temperature.

3. The hydrogen generator according to claim 1, wherein the program, when executed by the computer, further causes the controller to continue the cooling step until a temperature of the reformer becomes equal to or lower than a purge temperature.

4. The hydrogen generator according to claim 3, wherein the program, when executed by the computer, further causes the controller to continue the cooling step until the temperature of the reformer becomes equal to or lower than the purge temperature when the hydrogen generator abnormally stops.

5. The hydrogen generator according to claim 1, wherein:
the heat accumulator is a heat accumulator configured to store the first liquid heat medium having passed through the first heat exchanger; and
the first heat medium passage is a passage through which the first liquid heat medium having passed through the first heat exchanger is introduced to the heat accumulator and the first liquid heat medium having been discharged from the heat accumulator is introduced to the first heat exchanger,
the hydrogen generator further comprising:
a bypass passage which connects the first heat medium passage located upstream of the first heat exchanger and the first heat medium passage located downstream of the first heat exchanger and bypasses the heat accumulator;
a first switching device configured to switch a destination to which the first liquid heat medium having passed through the first heat exchanger flows, between the heat accumulator and the bypass passage; and
a first temperature detector configured to detect a temperature of the first liquid heat medium having passed through the first heat exchanger, wherein
the program, when executed by the computer, further causes the controller to maintain a state where the first switching device causes the first liquid heat medium to flow in the bypass passage until the temperature detected by the first temperature detector becomes equal to or higher than a first threshold in the cooling step.

6. The hydrogen generator according to claim 1, further comprising:
a second heat exchanger configured to recover the heat from the first liquid heat medium in the first heat medium passage;
a second heat medium passage through which a second heat medium flows, the second heat medium receiving the heat recovered from the first liquid heat medium in the second heat exchanger;
a second pump configured to cause the second heat medium in the second heat medium passage to flow;
a bypass passage which connects the second heat medium passage located upstream of the second heat exchanger and the second heat medium passage located downstream of the second heat exchanger and bypasses the heat accumulator;
a second switching device configured to switch a destination to which the second heat medium having passed through the second heat exchanger flows, between the heat accumulator and the bypass passage; and
a second temperature detector configured to detect a temperature of the second heat medium having passed through the second heat exchanger, wherein:
the heat accumulator is a heat accumulator configured to store the second heat medium having passed through the second heat exchanger;
the second heat medium passage is a passage through which the second heat medium having passed through the second heat exchanger is introduced to the heat accumulator and the second heat medium having been discharged from the heat accumulator is introduced to the second heat exchanger; and
the program, when executed by the computer, further causes the controller to maintain a state where the second switching device causes the second heat medium to flow in the bypass passage until the temperature detected by the second temperature detector becomes equal to or higher than the first threshold in the cooling step.

7. The hydrogen generator according to claim 1, further comprising a first temperature detector configured to detect a temperature of the first liquid heat medium having passed through the first heat exchanger, wherein
the program, when executed by the computer, further causes the controller to execute a first heat recovery operation and a second heat recovery operation in this order, the first heat recovery operation being such that a manipulated variable of the first pump is controlled based on the temperature detected by the first temperature detector, the second heat recovery operation being such that the manipulated variable of the first pump is forcibly controlled to be equal to or larger than a predetermined value regardless of the temperature detected by the first temperature detector.

8. The hydrogen generator according to claim 7, wherein:
the heat accumulator is a heat accumulator configured to store the first liquid heat medium having passed through the first heat exchanger; and the first heat medium passage is a passage through which the first liquid heat medium having passed through the first heat exchanger is introduced to the heat accumulator and the first liquid heat medium having been discharged from the heat accumulator is introduced to the first heat exchanger, the hydrogen generator further comprising:

a bypass passage which connects the first heat medium passage located upstream of the first heat exchanger and the first heat medium passage located downstream of the first heat exchanger and bypasses the heat accumulator; and a first switching device configured to switch a destination to which the first liquid heat medium having passed through the first heat exchanger flows, between the heat accumulator and the bypass passage, wherein the program, when executed by the computer, further causes the controller to switch the first switching device such that the first switching device causes the first liquid heat medium to flow in the heat accumulator in a case where the temperature detected by the first temperature detector is equal to or higher than the first threshold in the second heat recovery operation and switch the first switching device such that the first switching device causes the first liquid heat medium to flow in the bypass passage in a case where the temperature detected by the first temperature detector is equal to or lower than a second threshold that is smaller than the first threshold in the second heat recovery operation.

9. The hydrogen generator according to claim 1, further comprising:

a second heat exchanger configured to recover the heat from the first liquid heat medium in the first heat medium passage;

a second heat medium passage through which a second heat medium flows, the second heat medium receiving the heat recovered from the first liquid heat medium in the second heat exchanger;

a second pump configured to cause the second heat medium in the second heat medium passage to flow; and a second temperature detector configured to detect a temperature of the second heat medium having passed through the second heat exchanger, wherein:

the heat accumulator is a heat accumulator configured to store the second heat medium having passed through the second heat exchanger; and the program, when executed by the computer, further causes the controller to execute a first heat recovery operation and a second heat recovery operation in this order, the first heat recovery operation being such that a manipulated variable of the second pump is controlled based on the temperature detected by the second temperature detector, the second heat recovery operation being such that the manipulated variable of the second pump is forcibly controlled to be equal to or larger than a predetermined value regardless of the temperature detected by the second temperature detector.

10. The hydrogen generator according to claim 9, wherein the second heat medium passage is a passage through which the second heat medium having passed through the second heat exchanger is introduced to the heat accumulator and the second heat medium having been discharged from the heat accumulator is introduced to the second heat exchanger, the hydrogen generator further comprising:

a bypass passage which connects the second heat medium passage located upstream of the second heat exchanger and the second heat medium passage located downstream of the second heat exchanger and bypasses the heat accumulator; and a second switching device configured to switch a destination to which the second heat medium having passed through the second heat exchanger flows, between the heat accumulator and the bypass passage, wherein the program, when executed by the computer, further causes the controller to switch the switching device such that the switching device causes the second heat medium to flow in the heat accumulator in a case where the temperature detected by the second temperature detector is equal to or higher than the first threshold in the second heat recovery operation and switch the switching device such that the switching device causes the second heat medium to flow in the bypass passage in a case where the temperature detected by the second temperature detector is equal to or lower than a second threshold that is smaller than the first threshold in the second heat recovery operation.

11. The hydrogen generator according to claim 1, wherein:

in a raw material purging operation of purging an inside of the reformer by the raw material after the cooling step, the gas discharged from the reformer is combusted in the combustor, and the first pump is activated; and the program, when executed by the computer, further causes the controller to increase a manipulated variable of the first pump in the raw material purging operation as compared to in the cooling step.

12. The hydrogen generator according to claim 1, further comprising:

a second heat exchanger configured to recover the heat from the first liquid heat medium in the first heat medium passage;

a second heat medium passage through which a second heat medium flows, the second heat medium receiving the heat recovered from the first liquid heat medium in the second heat exchanger; and a second pump configured to cause the second heat medium in the second heat medium passage to flow, wherein:

in a raw material purging operation of purging an inside of the reformer by the raw material after the cooling step, the gas discharged from the reformer is combusted in the combustor, and the second pump is activated; and the program, when executed by the computer, further causes the controller to increase a manipulated variable of the second pump in the raw material purging operation as compared to in the cooling step.

13. A fuel cell system, comprising:

the hydrogen generator according to claim 1; and a fuel cell configured to generate electric power using the hydrogen-containing gas generated by the hydrogen generator.

14. The fuel cell system according to claim 13, wherein: a cathode purging operation of supplying the raw material to a cathode of the fuel cell and carrying out combustion in the combustor using a gas having passed through the cathode of the fuel cell is carried out; and the cooling step is a cooling step carried out after the cathode purging operation is terminated.

15. A method of operating a hydrogen generator comprising:

generating a hydrogen-containing gas by a reforming reaction in a reformer using a raw material;

heating the reformer by a combustor;

operating a first pump to cause a first liquid heat medium to flow through a first heat exchanger;

storing, by a heat accumulator, heat recovered via the first heat exchanger by the first liquid heat medium from a flue gas discharged from the combustor; and cooling down at least the reformer by supplying air from an air supplying device to the combustor, in a state where the combustor is not carrying out combustion when the hydrogen generator stops, and cooling down the air which has cooled down the reformer by operating the first pump to cause the first liquid heat medium to flow during the cooling down of at least the reformer by supplying the air.

16. The hydrogen generator according to claim 1, wherein the first heat exchanger is configured to recover heat from a flue gas of the combustor discharged outside the reformer.

* * * * *